(12) United States Patent
Lee

(10) Patent No.: US 11,632,542 B2
(45) Date of Patent: Apr. 18, 2023

(54) METHOD FOR ENCODING/DECODING VIDEO SIGNAL, AND APPARATUS THEREFOR

(71) Applicant: APPLE INC., Cupertino, CA (US)

(72) Inventor: Bae Keun Lee, Seongnam-si (KR)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/259,694

(22) PCT Filed: Feb. 26, 2020

(86) PCT No.: PCT/KR2020/002750
§ 371 (c)(1),
(2) Date: Jan. 12, 2021

(87) PCT Pub. No.: WO2020/175913
PCT Pub. Date: Sep. 3, 2020

(65) Prior Publication Data
US 2021/0297657 A1  Sep. 23, 2021

(30) Foreign Application Priority Data

Feb. 26, 2019 (KR) ........................ 10-2019-0022758

(51) Int. Cl.
*H04N 19/105* (2014.01)
*H04N 19/159* (2014.01)
*H04N 19/176* (2014.01)
*H04N 19/593* (2014.01)

(52) U.S. Cl.
CPC ........ *H04N 19/105* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS

| | | | |
|---|---|---|---|
| 10,873,756 B2 * | 12/2020 | Zhang | ................... H04N 19/70 |
| 11,134,244 B2 * | 9/2021 | Zhang | ................. H04N 19/159 |
| 2016/0241870 A1 | 8/2016 | Sugio et al. | |
| 2017/0155914 A1 | 6/2017 | Jeon et al. | |

(Continued)

FOREIGN PATENT DOCUMENTS

| | | |
|---|---|---|
| KR | 10-2016-0143583 A | 12/2016 |
| KR | 10-2017-0046770 A | 5/2017 |
| WO | 2017/171370 A1 | 10/2017 |

OTHER PUBLICATIONS

International Preliminary Report on Patentability in International Appln. No. PCT/KR2020/002750, dated Sep. 10, 2021, 11 pages (with English Translation).

(Continued)

*Primary Examiner* — Chikaodili E Anyikire
(74) *Attorney, Agent, or Firm* — Fish & Richardson P.C.

(57) ABSTRACT

A method for decoding a video, according to the present invention, may comprise the steps of: generating an intra block copy (IBC) merge candidate list for a current block; selecting any one of IBC merge candidates included in the IBC merge candidate list; deriving a block vector of the current block on the basis of the selected IBC merge candidate; and obtaining a prediction sample of the current block on the basis of the block vector.

8 Claims, 19 Drawing Sheets

(a)

(b)

(56) References Cited

U.S. PATENT DOCUMENTS

| | | | | |
|---|---|---|---|---|
| 2019/0246143 A1* | 8/2019 | Zhang | .................. | H04N 19/503 |
| 2020/0195960 A1* | 6/2020 | Zhang | .................... | H04N 19/70 |
| 2020/0204820 A1* | 6/2020 | Zhang | .................... | H04N 19/52 |
| 2020/0236384 A1* | 7/2020 | Xu | ........................ | H04N 19/503 |
| 2020/0260105 A1* | 8/2020 | Han | ...................... | H04N 19/52 |
| 2020/0275093 A1* | 8/2020 | Lin | ...................... | H04N 19/159 |
| 2021/0006787 A1* | 1/2021 | Zhang | .................. | H04N 19/136 |
| 2021/0014528 A1* | 1/2021 | Xu | ........................ | H04N 19/70 |
| 2021/0160529 A1* | 5/2021 | Zhang | .................. | H04N 19/105 |
| 2021/0211709 A1* | 7/2021 | Zhang | .................... | H04N 19/82 |
| 2021/0281877 A1* | 9/2021 | Liu | ...................... | H04N 19/184 |

OTHER PUBLICATIONS

International Search Report and Written Opinion in International Appln. No. PCT/KR2020/002750, dated Jun. 9, 2020, 13 pages (with English Translation).

* cited by examiner

【FIG. 1】
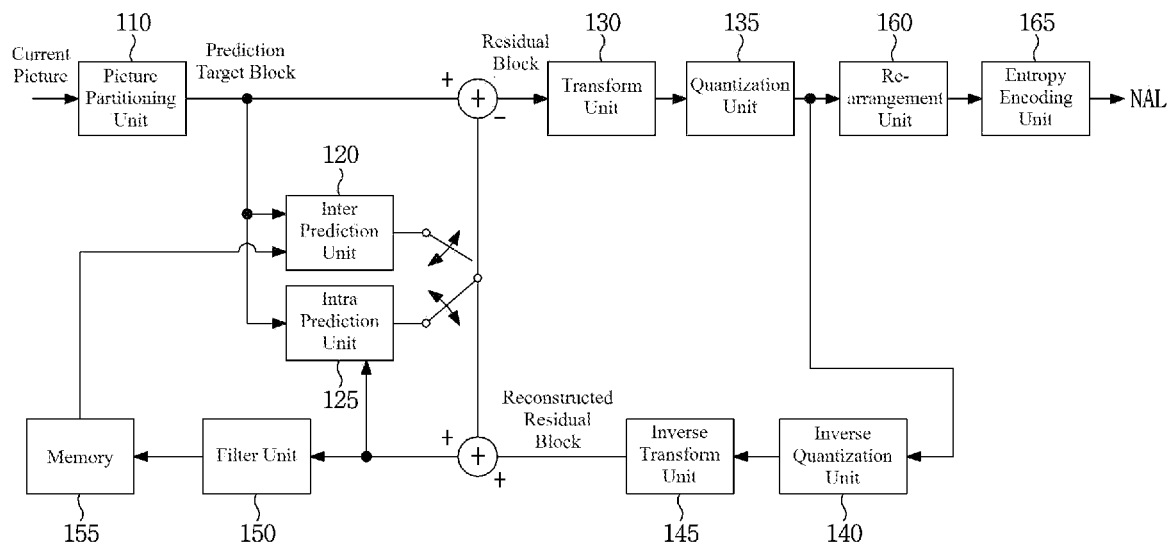
【FIG. 2】
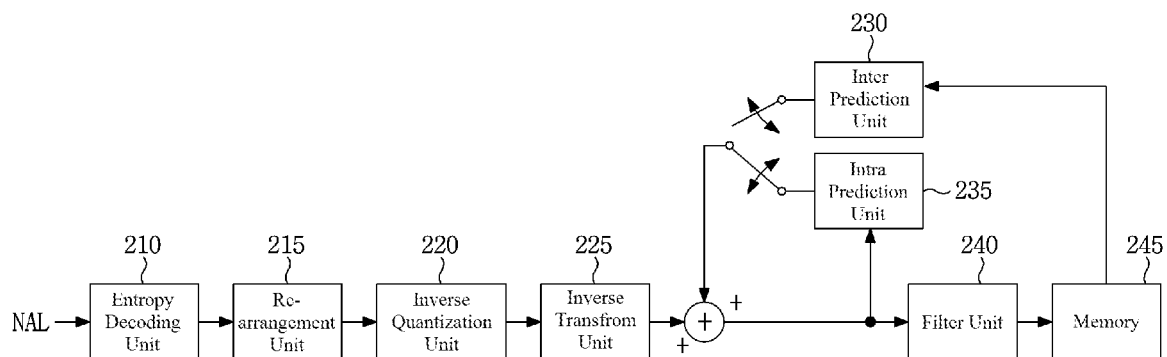

[FIG. 3]
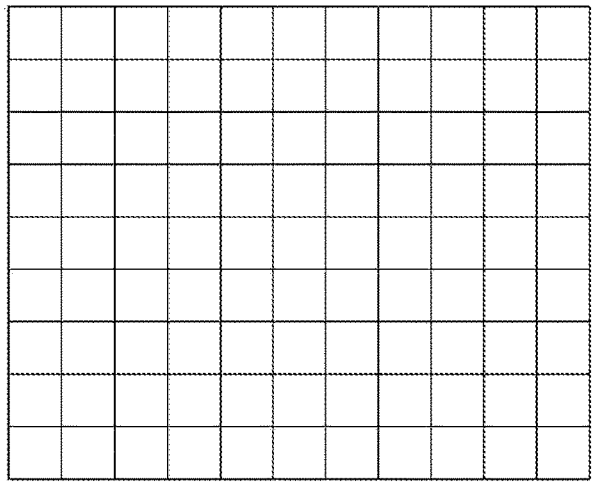
[FIG. 4]
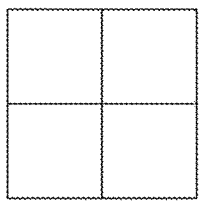 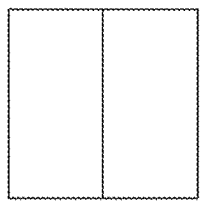 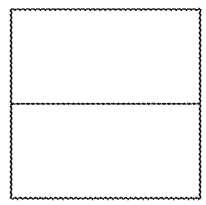 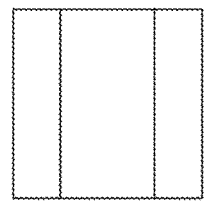 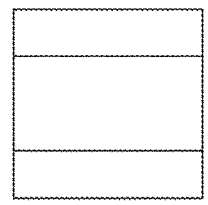
SPLIT_QT     SPLIT_BT_VER     SPLIT_BT_HOR     SPLIT_TT_VER     SPLIT_TT_HOR
[FIG. 5]
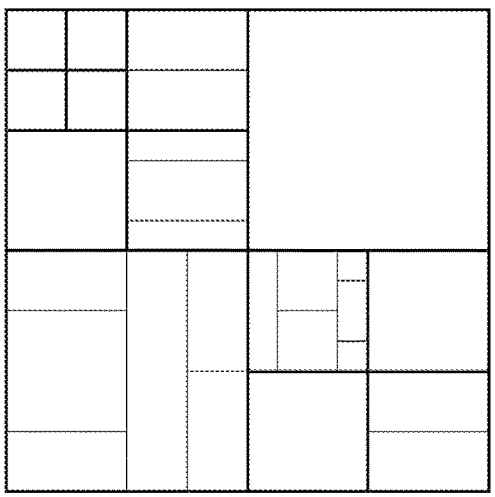

【FIG. 6】
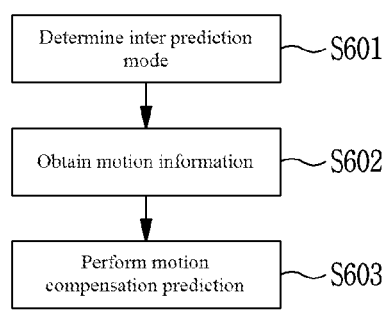
【FIG. 7】
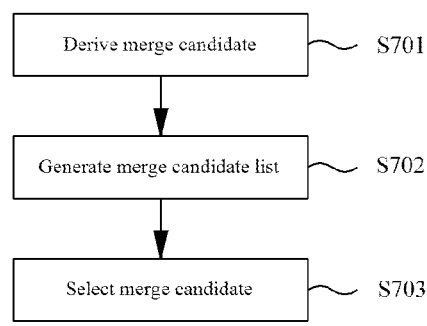

[FIG. 8]
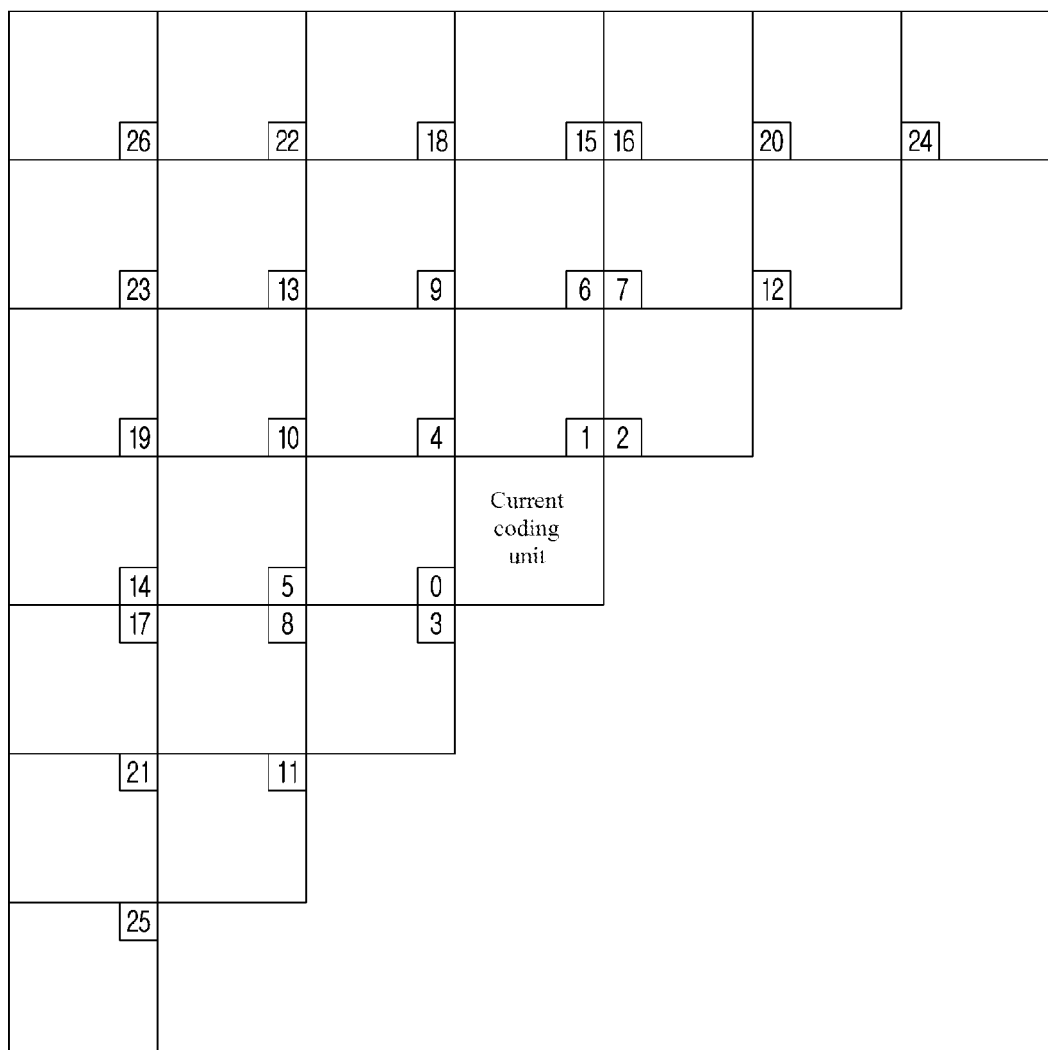

[FIG. 9]
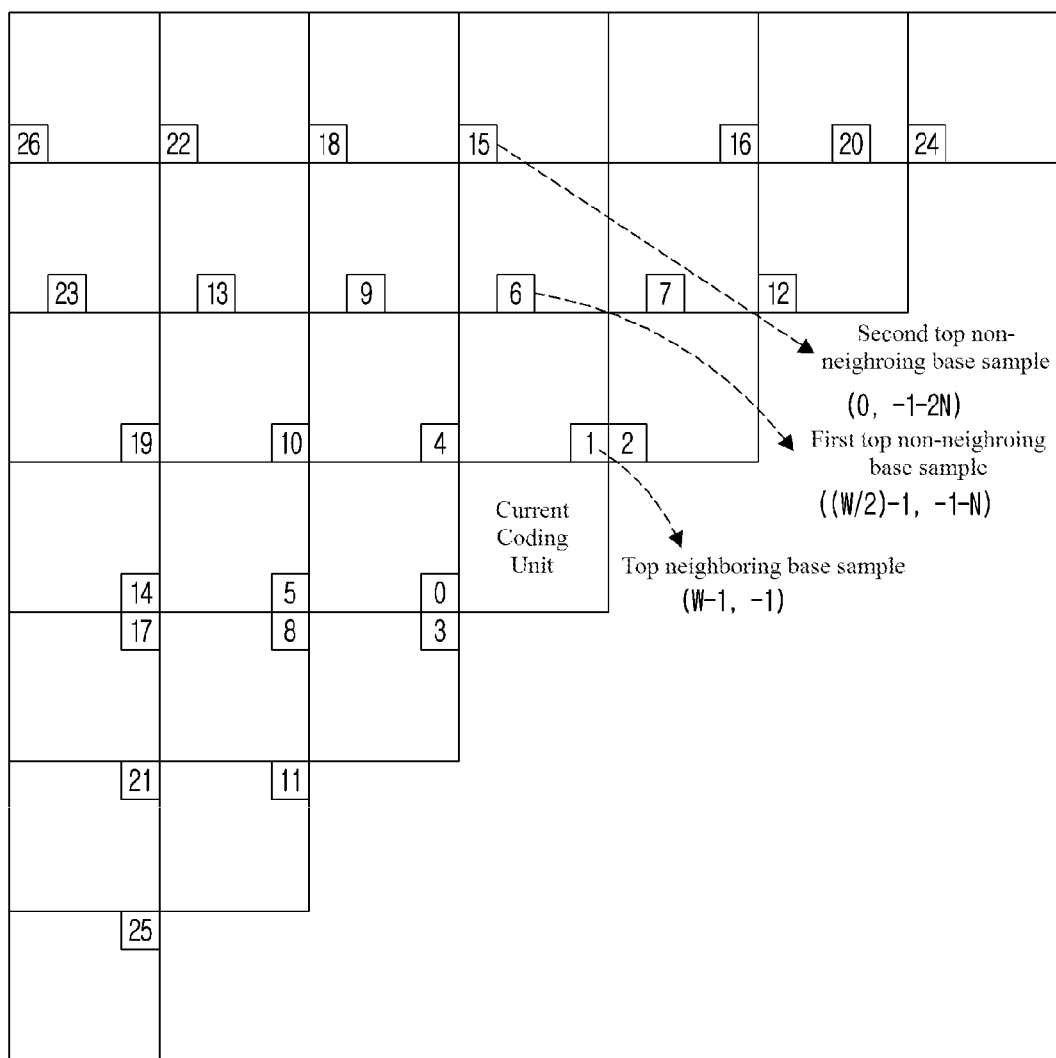

【FIG. 10】
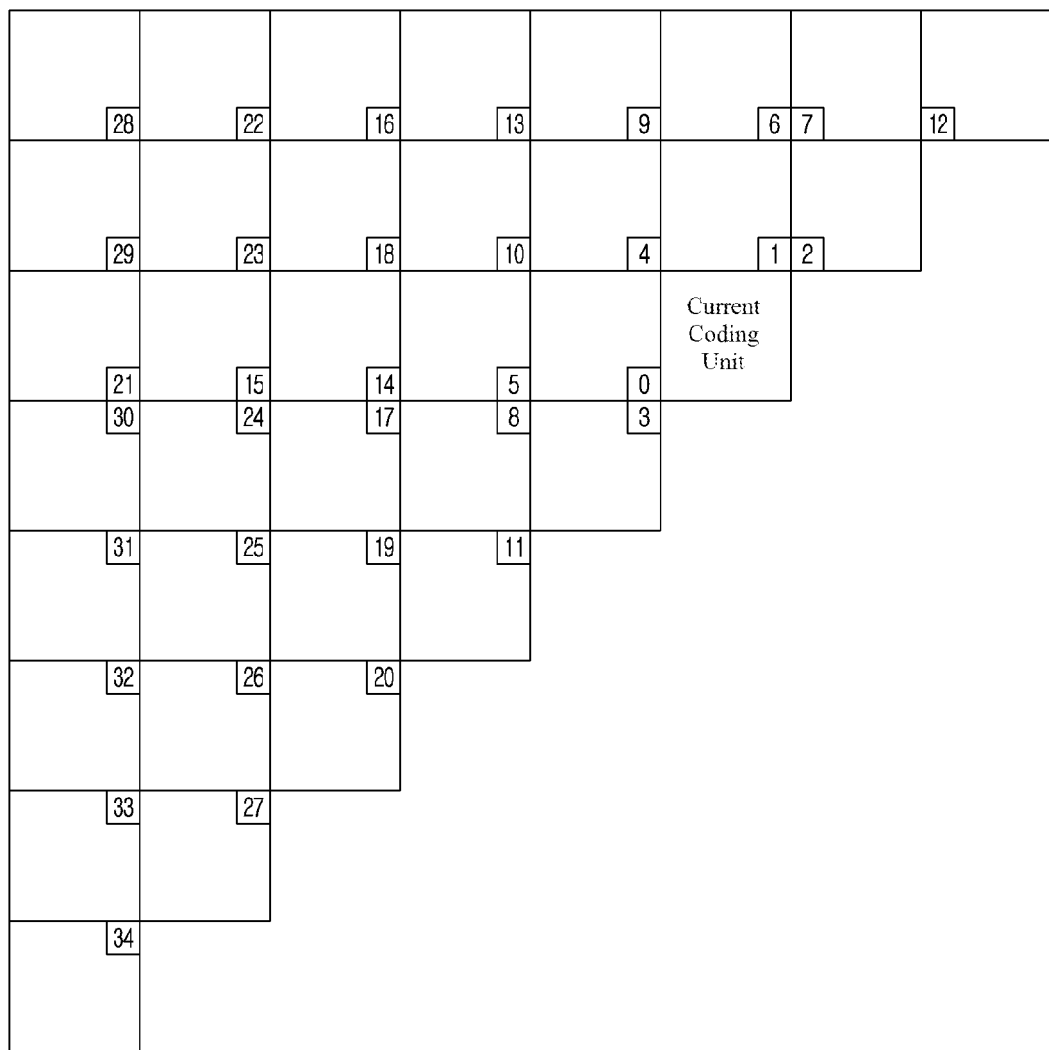

【FIG. 11】
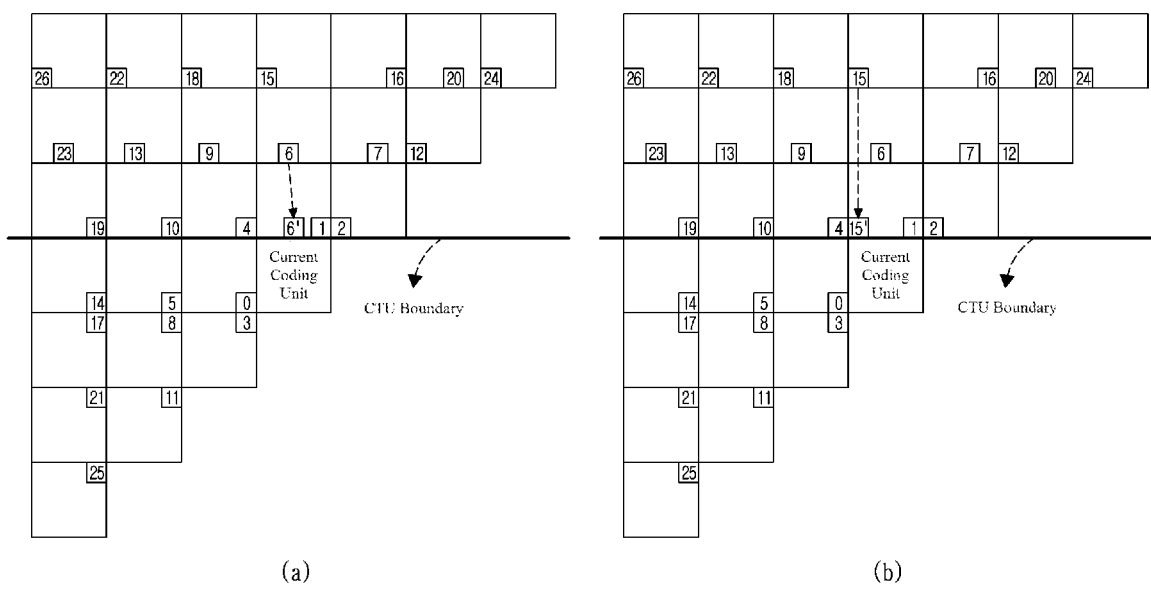
(a)            (b)

【FIG. 12】
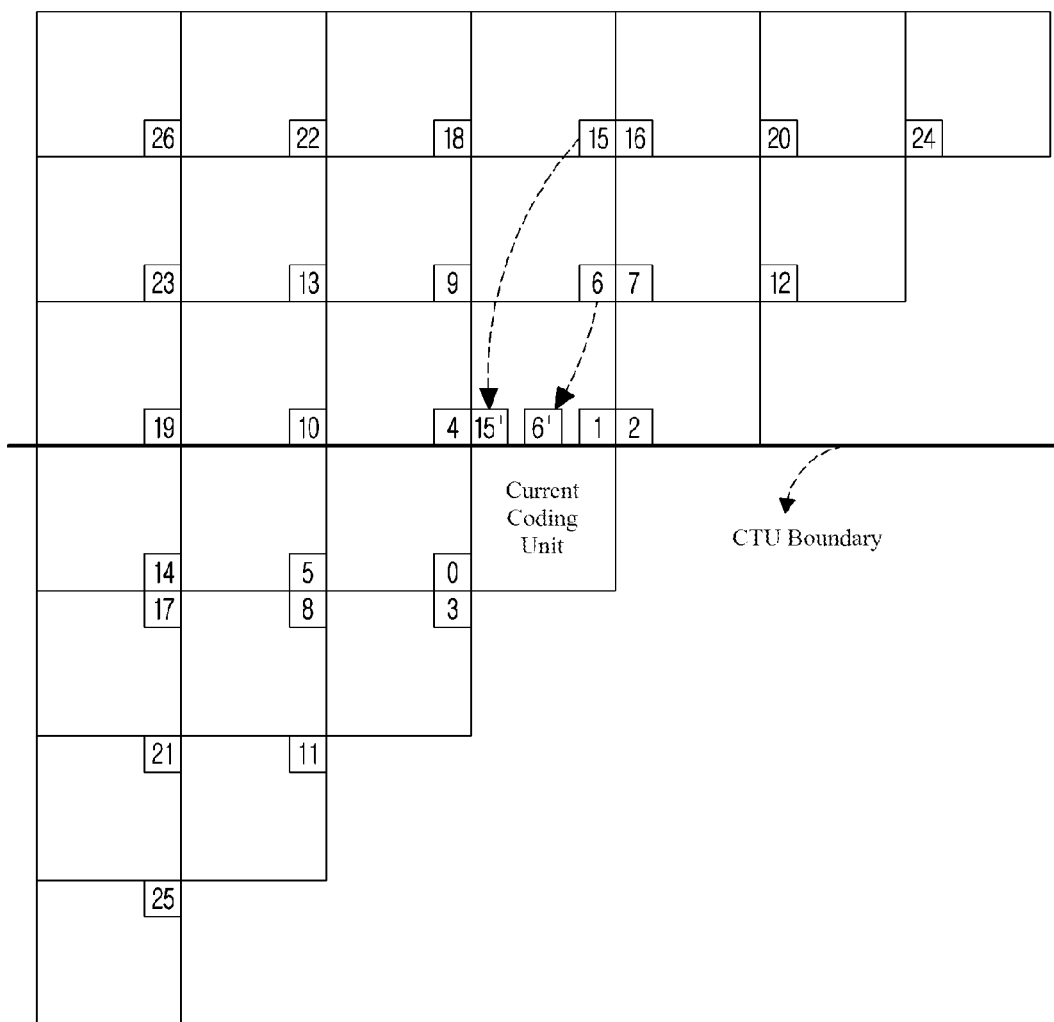

【FIG. 13】
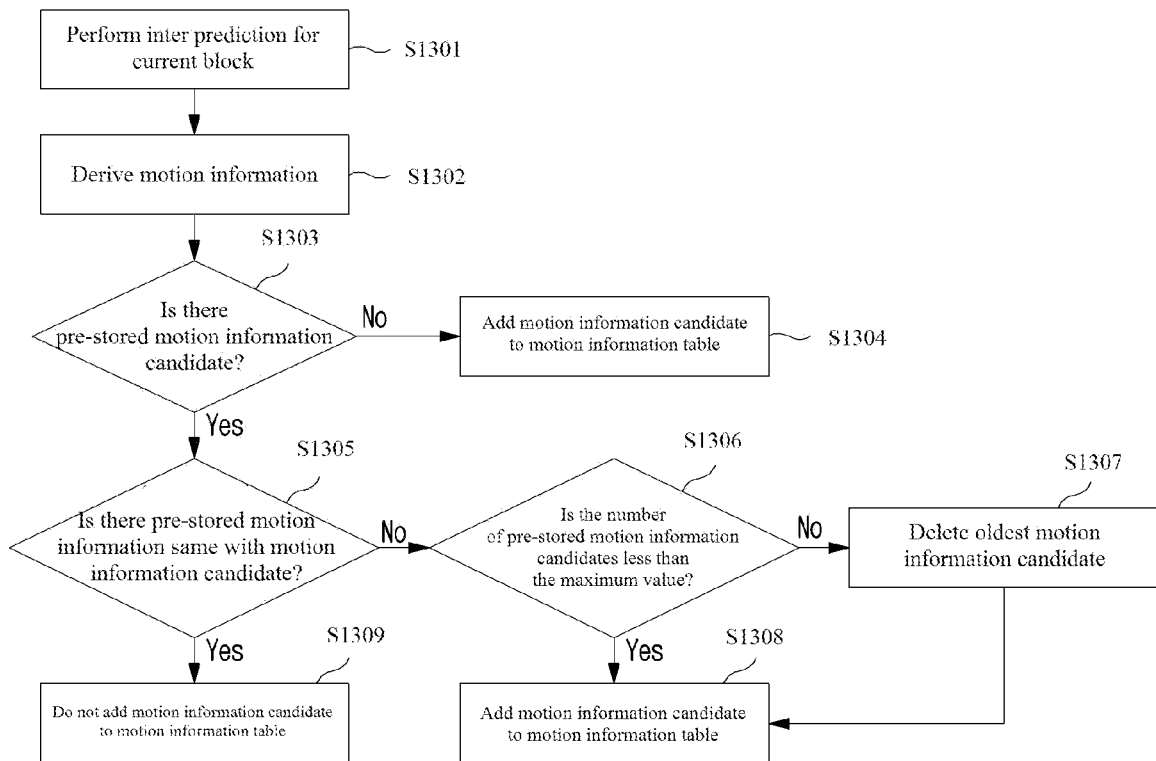
【FIG. 14】
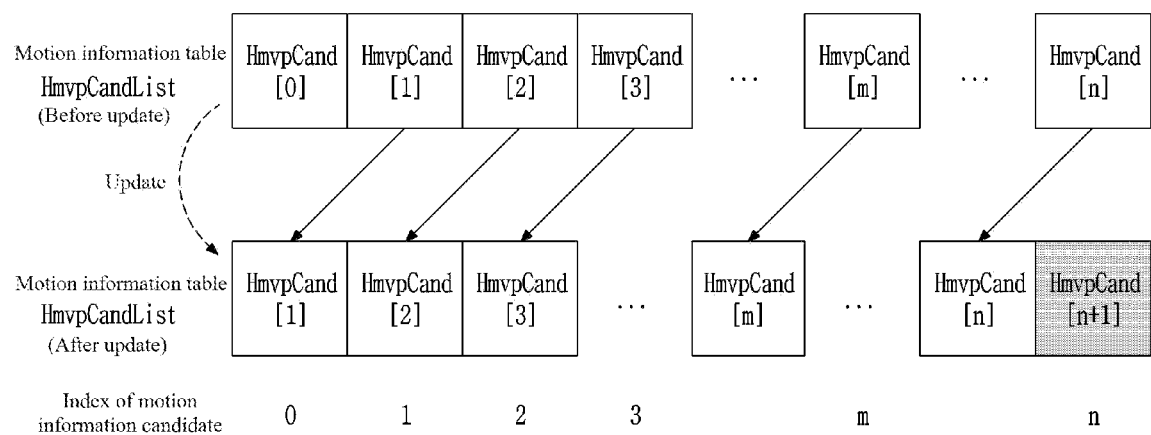

【FIG. 15】
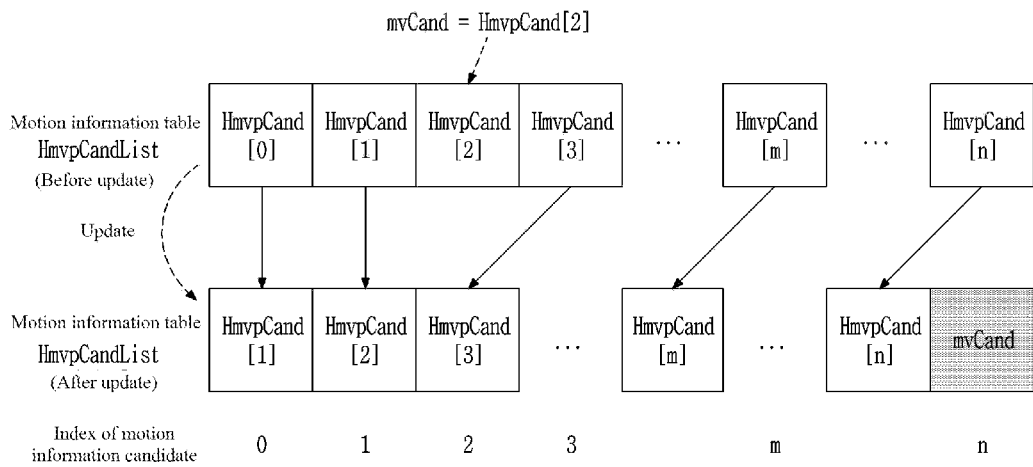
【FIG. 16】
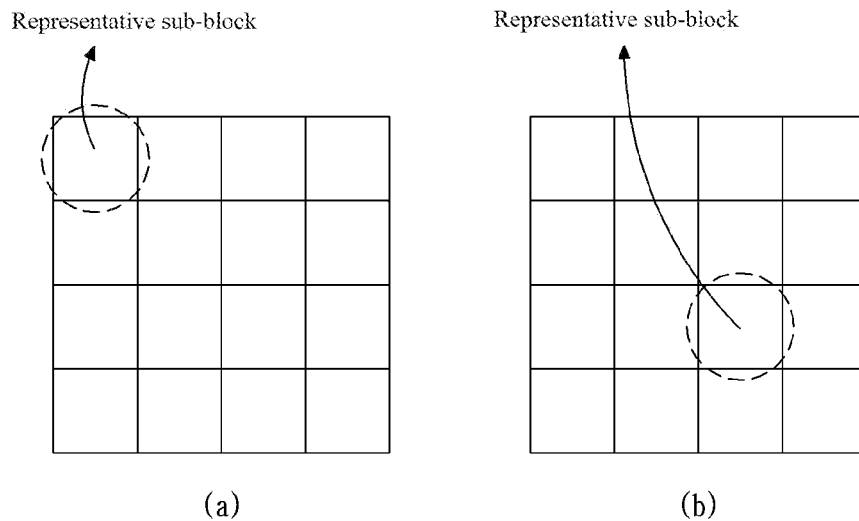
(a)         (b)

[FIG. 17]
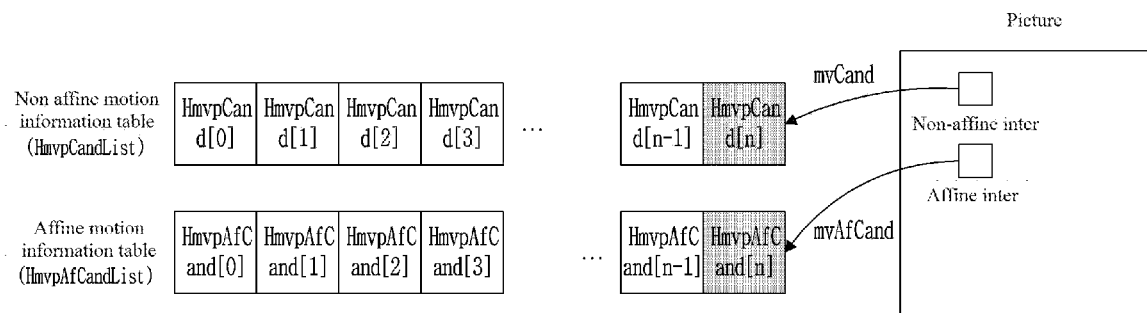
[FIG. 18]
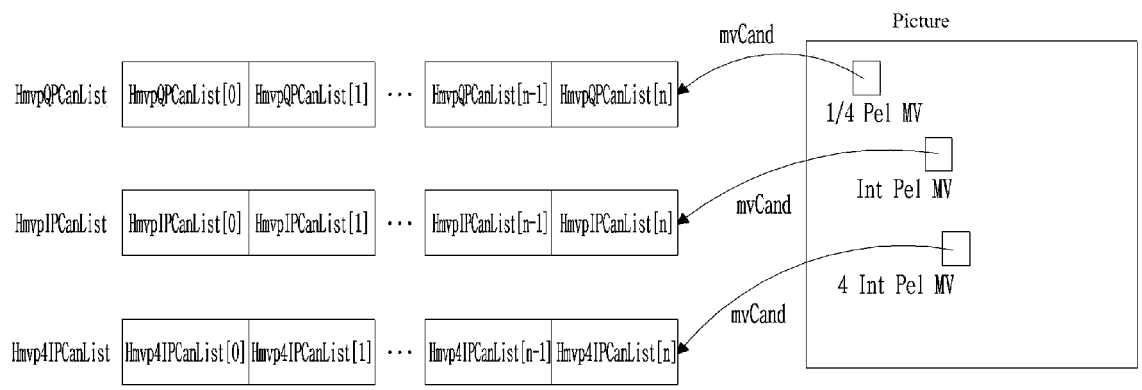
[FIG. 19]
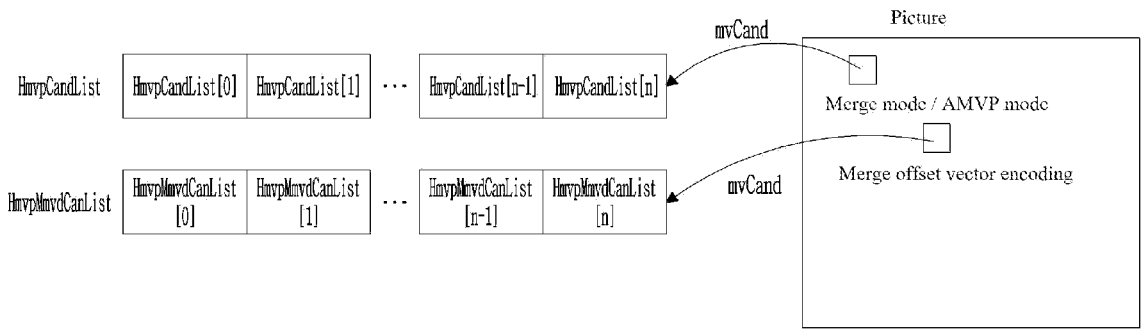

[FIG. 20]
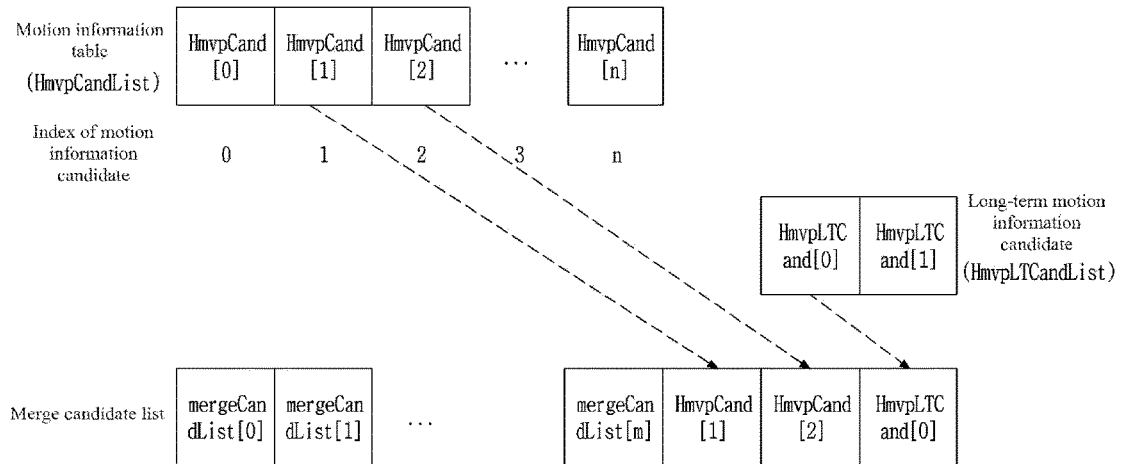
[FIG. 21]
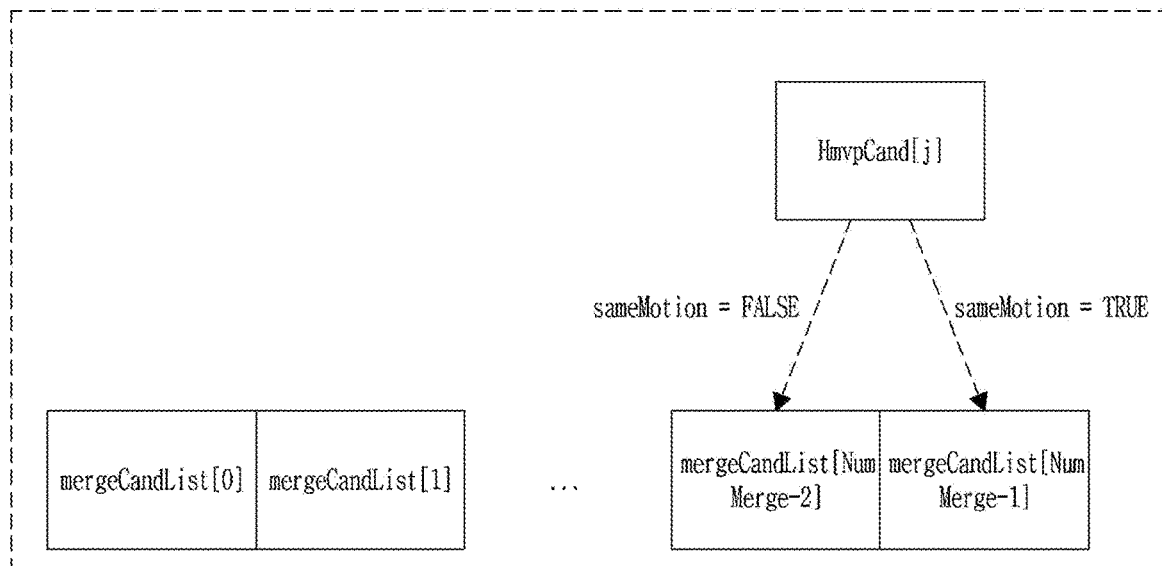

【FIG. 22】
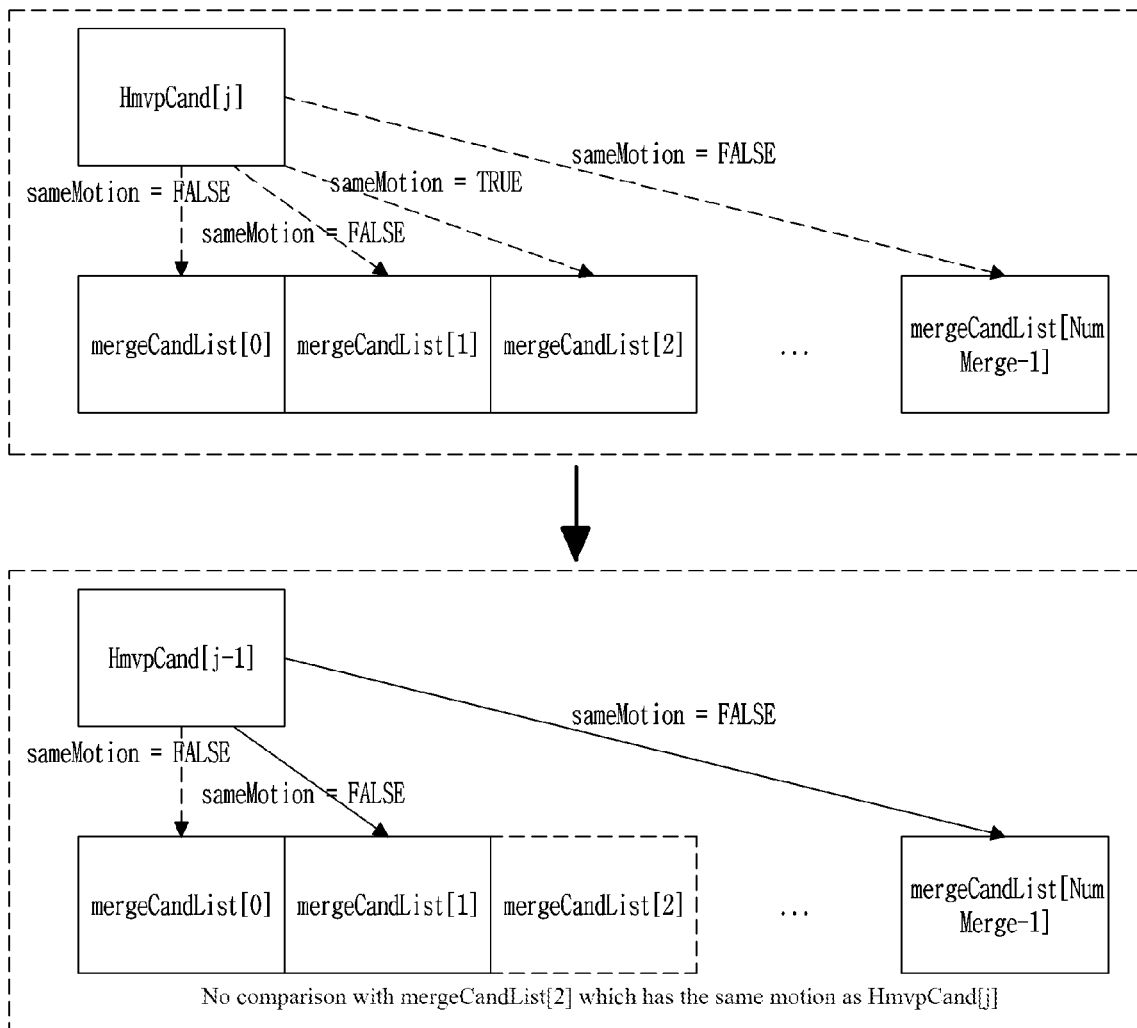

【FIG. 23】
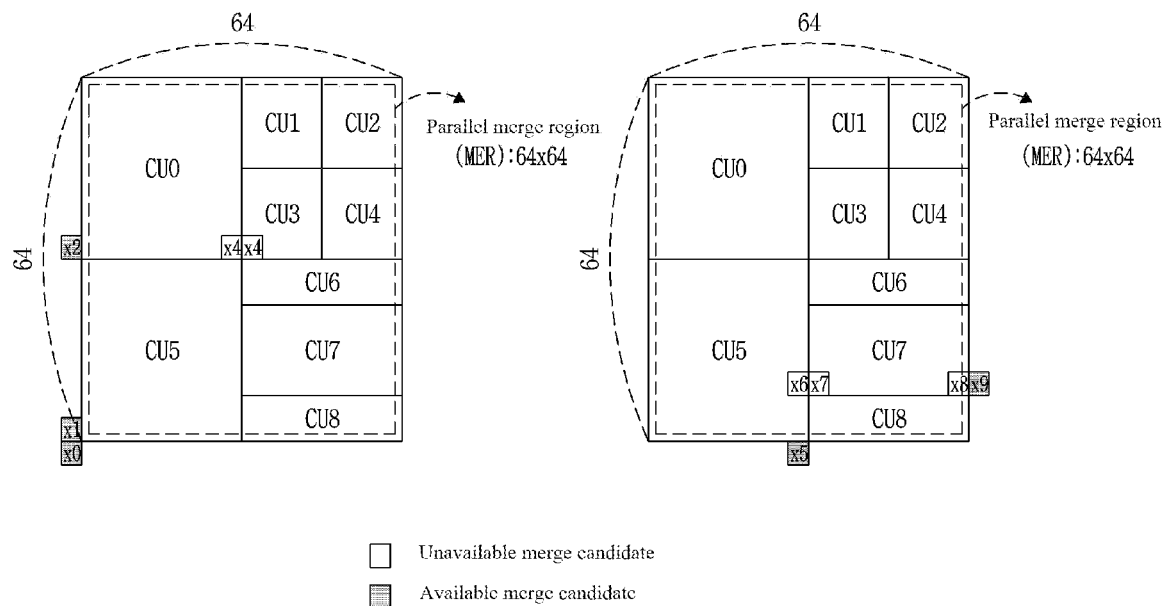
【FIG. 24】
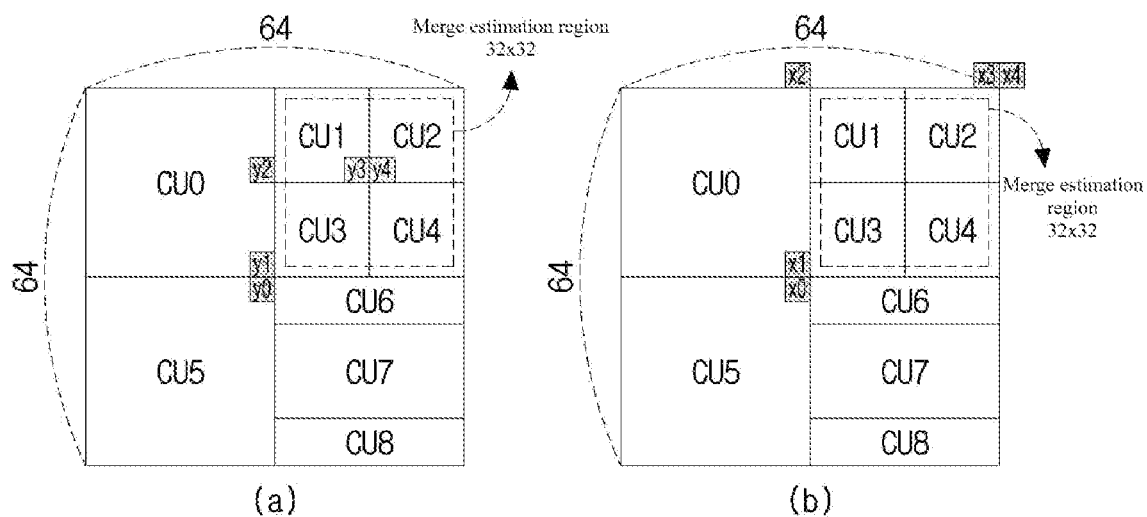

【FIG. 25】
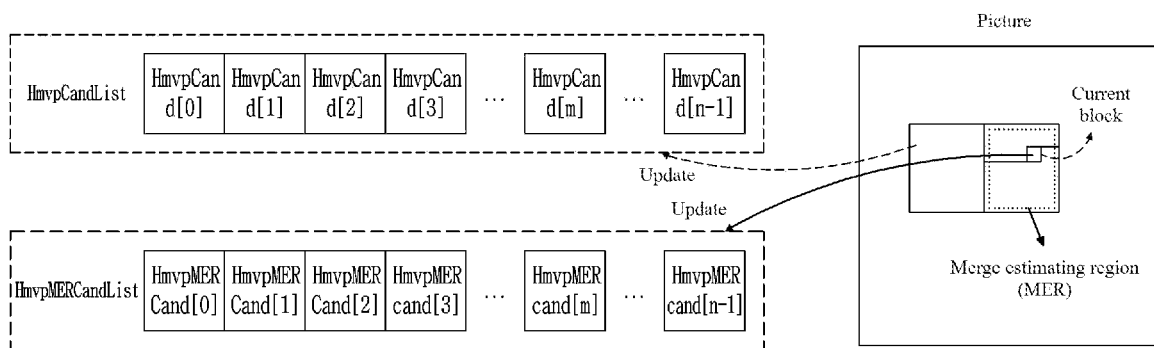
【FIG. 26】
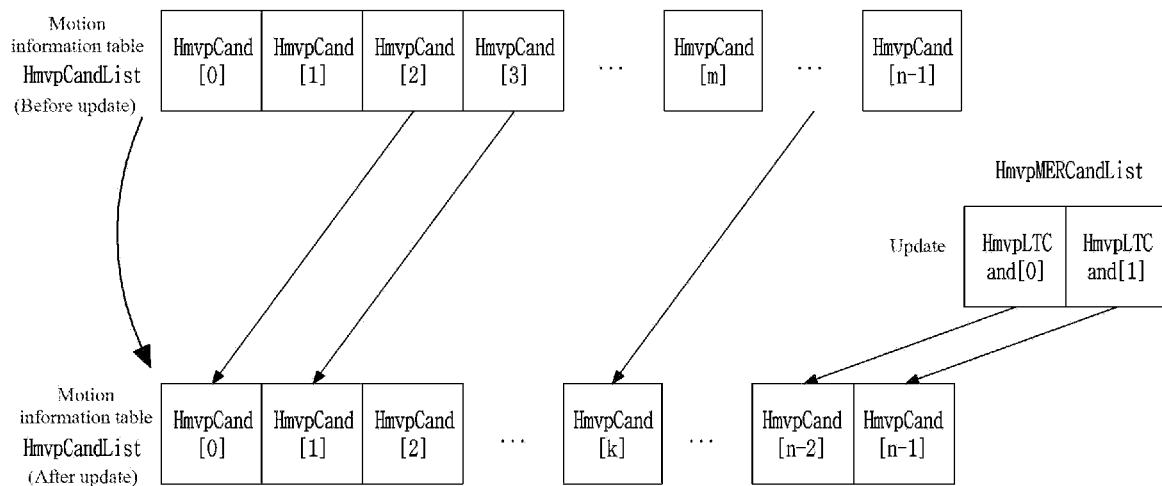

[FIG. 27]
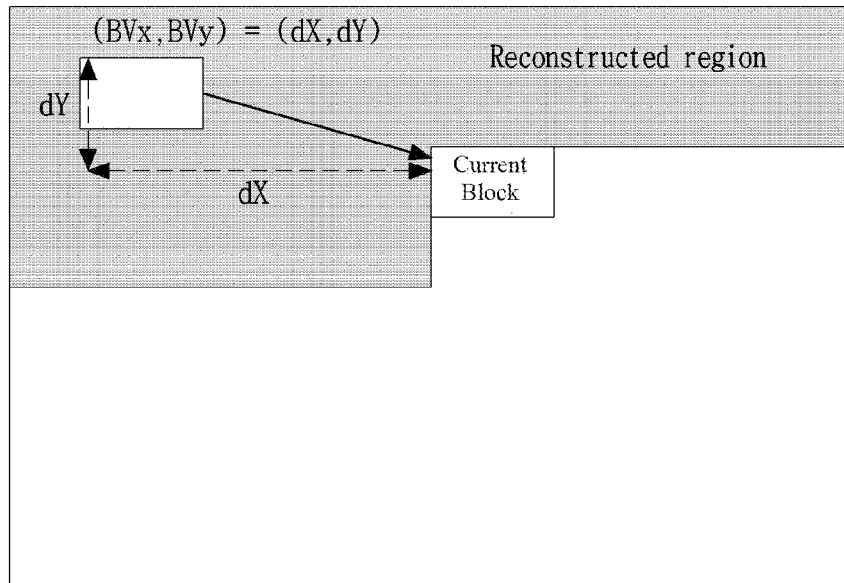
[FIG. 28]
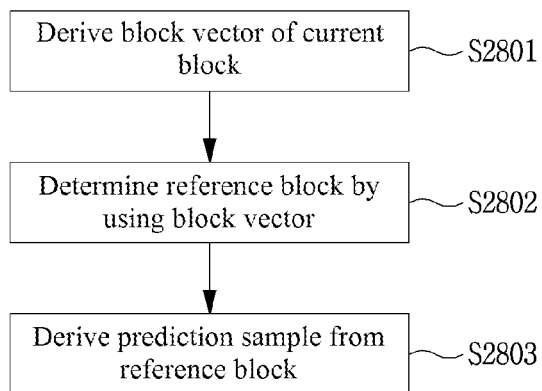

[FIG. 29]
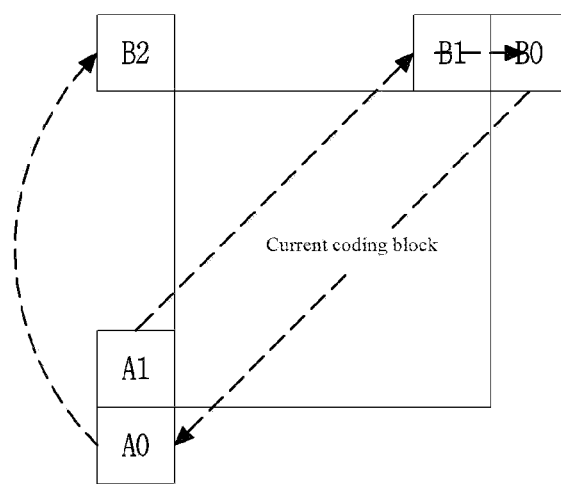

[FIG. 30]
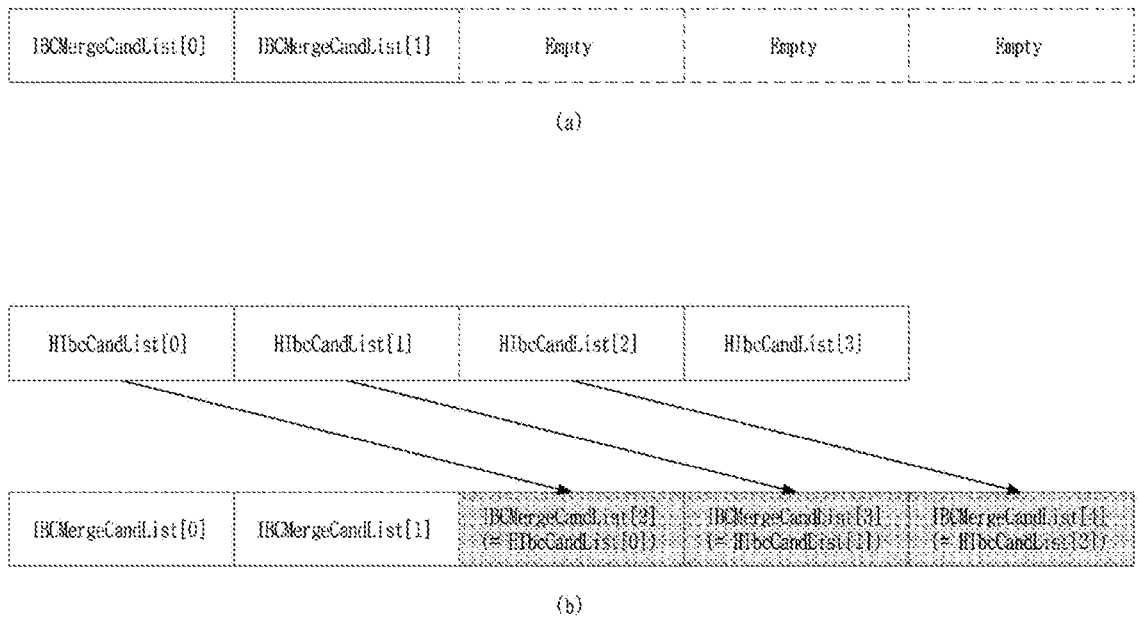
[FIG. 31]
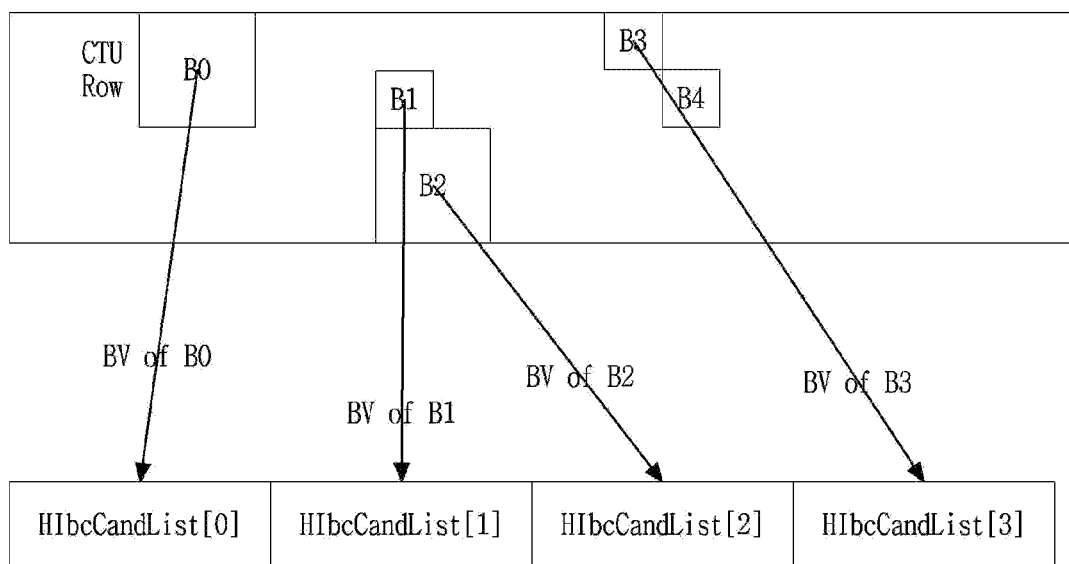

[FIG. 32]
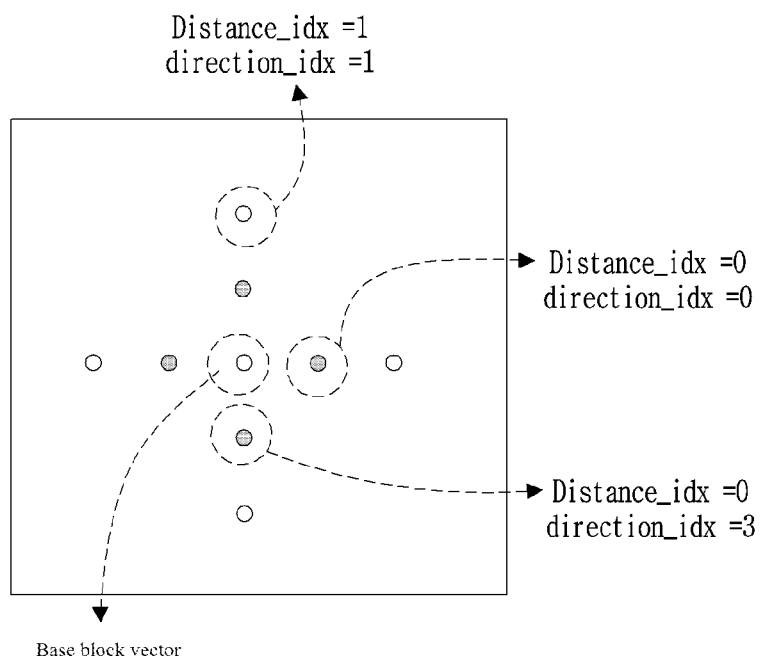
[FIG. 33]
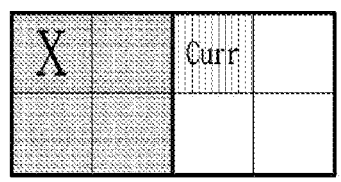 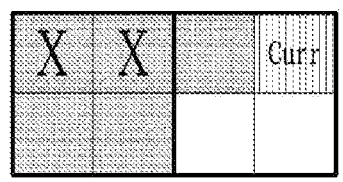
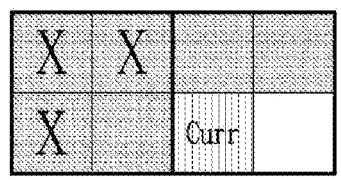 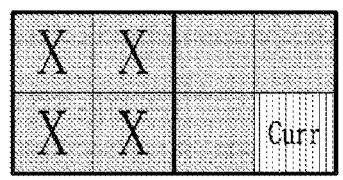

METHOD FOR ENCODING/DECODING VIDEO SIGNAL, AND APPARATUS THEREFOR

This application claims the benefit under 35 U.S.C. section 371, of PCT International Application No.: PCT/KR2020/002750, filed on Feb. 26, 2020, which claims foreign priority to Korean Patent Application No.: 10-2019-0022758, filed on Feb. 26, 2019, in the Korean Intellectual Property Office, the disclosures of which are hereby incorporated by reference in their entireties.

FIELD OF THE DISCLOSURE

The present disclosure relates to a video signal encoding/decoding method and a device therefor.

DESCRIPTION OF THE RELATED ART

As display panels become larger, video service of higher quality is required. The biggest problem with high-definition video service is that an amount of data is greatly increased. In order to solve the above problem, research for improving the video compression rate is being actively conducted. As a representative example, the Joint Collaborative Team on Video Coding (JCT-VC) was formed in 2009 by the Motion Picture Experts Group (MPEG) and the Video Coding Experts Group (VCEG) under the International Telecommunication Union-Telecommunication (ITU-T). The JCT-VC proposed High Efficiency Video Coding (HEVC), a video compression standard that has about twice compression performance of H.264/AVC, and that was approved as standard on Jan. 25, 2013. However, with rapid development of high-definition video services, the performance of HEVC is gradually showing its limitations.

DISCLOSURE

Technical Problem

The present disclosure is directed to providing a prediction method using an intra block copy mode, and a device for performing the method, in encoding/decoding a video signal.

The present disclosure is directed to providing a method of deriving a block vector of a current block, and a device for performing the method, in encoding/decoding a video signal.

The present disclosure is directed to providing a method of deriving a block vector by using a motion information table, and a device for performing the method, in encoding/decoding a video signal.

Technical purposes obtainable from the present disclosure are non-limited to the above-mentioned technical purposes, and other unmentioned technical purposes may be clearly understood from the following description by those having ordinary skill in the technical field to which the present disclosure pertains.

Technical Solution

According to the present disclosure, a video signal decoding/encoding method includes: generating an intra block copy (IBC) merge candidate list for a current block; selecting any one of IBC merge candidates included in the IBC merge candidate list; deriving a block vector of the current block on the basis of the selected IBC merge candidate; and acquiring a prediction sample of the current block on the basis of the block vector.

Herein, the IBC merge candidate list includes an IBC merge candidate derived on the basis of an IBC motion information table, and the IBC motion information table includes an IBC motion information candidate derived from a block to which an IBC mode is applied before the current block.

In the video signal decoding/encoding method according to the present disclosure, the method may further include updating, after decoding of the current block is completed, the IBC motion information table with the block vector of the current block.

Herein, when an IBC merge candidate identical to the block vector is included in the IBC motion information table, the IBC merge candidate is removed and the block vector is added to the IBC motion information table.

In the video signal decoding/encoding method according to the present disclosure, when a size of the current block is smaller than a threshold value, the IBC motion information table is not updated on the basis of the block vector of the current block.

In the video signal decoding/encoding method according to the present disclosure, the IBC merge candidate list may include an IBC merge candidate derived from an available neighboring block adjacent to the current block, and different numbers of the available neighboring blocks may be determined depending on a size of the current block.

In the video signal decoding/encoding method according to the present disclosure, the maximum number of the IBC merge candidates that the IBC merge candidate list is able to include may be equal to or smaller than the maximum number of merge candidates that a general merge candidate list is able to include.

It is to be understood that the foregoing summarized features are exemplary aspects of the following detailed description of the present disclosure without limiting the scope of the present disclosure.

Advantageous Effects

According to the present disclosure, the efficiency of prediction can be improved using an intra block copy mode.

According to the present disclosure, a method of deriving a block vector by using neighboring blocks adjacent to the current block is provided, thereby improving the efficiency of prediction.

According to the present disclosure, a method of deriving a block vector by using a motion information table, thereby improving the efficiency of prediction.

Effects obtainable from the present disclosure may be non-limited by the above-mentioned effect, and other unmentioned effects may be clearly understood from the following description by those having ordinary skill in the technical field to which the present disclosure pertains.

DESCRIPTION OF DRAWINGS

FIG. 1 is a view showing a block diagram of a video encoding device (encoder) according to an embodiment of the present disclosure;

FIG. 2 is a view showing a block diagram of a video decoding device (decoder) according to an embodiment of the present disclosure;

FIG. 3 is a view showing a basic coding tree unit according to an embodiment of the present disclosure;

FIG. 4 is a view showing various partitioning types of a coding block.

FIG. 5 is a view of an example showing an aspect of partitioning a CTU.

FIG. 6 is a flow diagram of an inter prediction method according to an embodiment of the present disclosure.

FIG. 7 is a flow diagram of a process deriving the current block motion information under a merge mode.

FIG. 8 is a diagram of illustrating candidate blocks used to derive a merge candidate.

FIG. 9 is a view showing positions of base samples.

FIG. 10 is a view showing an example of candidate blocks used to drive a merge candidate.

FIG. 11 is a view showing an example in which a position of a base sample is changed.

FIG. 12 is a view showing an example in which a position of a base sample is changed.

FIG. 13 is a diagram to explain the update aspect of a motion information table.

FIG. 14 is a diagram showing the update aspect of a motion information table.

FIG. 15 is a diagram showing an example in which the index of a saved motion information candidate is renewed.

FIG. 16 is a diagram showing the position of a representative sub-block.

FIG. 17 shows an example in which a motion information table is generated per inter-prediction mode.

FIG. 18 is a view showing an example in which a motion information table is generated for each motion vector resolution.

FIG. 19 is a view showing an example in which motion information of a block to which a merge offset encoding method is applied is stored in a separate motion information table.

FIG. 20 is a diagram showing an example in which a motion information candidate included in a long-term motion information table is added to a merge candidate list.

FIG. 21 is a diagram showing an example in which a redundancy check is performed only for a part of merge candidates.

FIG. 22 is a diagram showing an example in which a redundancy check with a specific merge candidate is omitted.

FIG. 23 is a diagram showing an example in which a candidate block included in the same merge processing region as a current block is set to be unavailable as a merge candidate.

FIG. 24 is a diagram showing an example deriving a merge candidate for a current block when a current block is included in a merge processing region.

FIG. 25 is a diagram showing a temporary motion information table.

FIG. 26 is a diagram showing an example in which a motion information table and a temporary motion information table are unified.

FIG. 27 is a view showing a prediction aspect based on an intra block copy mode.

FIG. 28 is a flowchart showing a process of predicting a current block on the basis of an intra block copy mode according to an embodiment of the present disclosure.

FIG. 29 is a view showing an example of an order of adding IBC merge candidates to an IBC merge candidate list.

FIG. 30 is a view showing an example of adding an IBC motion information candidate to an IBC merge candidate list.

FIG. 31 is a view showing an update aspect of an IBC motion information table.

FIG. 32 is a view showing an offset vector according to a value of distance_idx indicating a size of an offset vector and to a value of direction_idx indicating a direction of an offset vector.

FIG. 33 is a view showing an example of an unavailable region according to a position of a current block.

MODE FOR INVENTION

Hereinafter, embodiments of the present disclosure will be described in detail with reference to the accompanying drawings.

Image encoding and decoding is performed on a basis of a block. In an example, for a coding block, a transform block, or a prediction block, encoding/decoding processes such as transform, quantization, prediction, in-loop filtering, reconstruction, etc. may be performed.

Hereinafter, an encoding/decoding target block is referred to as a "current block". In an example, a current block may represent a coding block, a transform block, or a prediction block according to a current process of encoding/decoding.

In addition, the term "unit" used in the present specification represents a basis unit for performing a specific encoding/decoding process, and a "block" may be understood to represent a sample array having a predetermined size. Unless otherwise stated, "block" and "unit" may be used interchangeably. In an example, in examples described later, a coding block and a coding unit may be understood to have the same meaning as each other.

FIG. 1 is view showing a block diagram of an image encoding apparatus (encoder) according to an embodiment of the present disclosure.

Referring to FIG. 1, an image encoding apparatus 100 may include a picture partitioning unit 110, prediction units 120 and 125, a transform unit 130, a quantization unit 135, a rearrangement unit 160, an entropy encoding unit 165, a dequantization unit 140, an inverse-transform unit 145, a filter unit 150, and a memory 155.

Components described in FIG. 1 are independently illustrated in order to show different characteristic functions in an image encoding apparatus, and the figure does not mean that each component is constituted by separated hardware or one software unit. That is, each component is just enumerated for convenience of explanation, at least two components of respective components may constitute one component or one component may be partitioned into a plurality of components which may perform their functions. Even an embodiment of integrating respective components and embodiment of dividing a component are also included in the scope of the present disclosure unless they are departing from the spirit of the present disclosure.

Further, some components are not requisite components that perform essential functions of the present disclosure but are optional components for just improving performance. The present disclosure may be implemented with the requisite component for implementing the spirit of the present disclosure other than the component used to just improve the performance and a structure including only the requisite component other than the optional component used to just improve the performance is also included in the scope of the present disclosure.

The picture partitioning unit 110 may partition an input picture into at least one processing unit. In this connection, the processing unit may be a prediction unit (PU), a transform unit (TU), or a coding unit (CU). In the picture partitioning unit 110, a single picture may be partitioned into combinations of a plurality of coding units, prediction units, and transform units, and the picture may be encoded by selecting a combination of the coding units, the prediction units, and the transform units according to a predetermined condition (for example, cost function).

For example, a single picture may be partitioned into a plurality of coding units. In order to partition a picture into coding units, a recursive tree structure such as a quad-tree structure may be used, and a coding unit that is originated from a root such as a single image or largest coding unit may be partitioned into other coding units and may have child nodes as many as the partitioned coding units. A coding unit that is no longer partitioned according to certain restrictions becomes a leaf node. Namely, when it is assumed that only square partitioning is available for a single coding unit, a single coding unit may be partitioned into at most four other coding units.

Hereinafter, in the embodiment of the present disclosure, a coding unit may be used as a unit for encoding or may be used as a unit for decoding.

A prediction unit may be obtained by partitioning a single coding unit into at least one square or rectangle having the same size, or a single coding unit may be partitioned into prediction units in such a manner that one prediction unit may be different from another prediction unit in a shape and/or size.

In generation of a prediction unit based on a coding block to which intra-prediction is being performed, when the coding unit is not the smallest coding unit, intra-prediction may be performed without performing partitioning into a plurality of N×N prediction units.

The prediction units 120 and 125 may include an inter-prediction unit 120 performing inter-prediction and an intra prediction unit 125 performing intra-prediction. Whether to perform inter-prediction or intra-prediction on a prediction unit may be determined, and detailed information (for example, an intra-prediction mode, a motion vector, a reference picture, etc.) according to each prediction method may be determined. In this connection, a processing unit on which prediction is performed may differ with a processing unit for which a prediction method, and detail thereof are determined. For example, a prediction method, a prediction mode, etc. may be determined on the basis of a prediction unit, and prediction may be performed on the basis of a transform unit. A residual value (residual block) between the generated prediction block and an original block may be input to the transform unit 130. In addition, prediction mode information used for prediction, motion vector information, etc. may be encoded using a residual value by the entropy encoding unit 165 and may be transmitted to the decoder. When a specific encoding mode is used, an original block is encoded as it is and transmitted to a decoding unit without generating a prediction block through the prediction unit 120 or 125.

The inter-prediction unit 120 may predict a prediction unit on the basis of information on at least one of a previous picture and a subsequent picture of a current picture, or in some cases, may predict a prediction unit on the basis of information on some encoded regions in the current picture. The inter-prediction unit 120 may include a reference picture interpolation unit, a motion prediction unit, and a motion compensation unit.

The reference picture interpolation unit may receive reference picture information from the memory 155, and generate pixel information of a pixel at an integer or less from the reference picture. In case of a luma pixel, an 8-tap DCT-based interpolation filter having different coefficients may be used so as to generate pixel information on a pixel at an integer or less for a ¼ pixel unit. In case of a chroma signal, a 4-tap DCT-based interpolation filter having different filter coefficients may be used so as to generate pixel information on a pixel at an integer or less for a ⅛ pixel unit.

The motion prediction unit may perform motion prediction based on a reference picture interpolated by the reference picture interpolation unit. As methods for calculating a motion vector, various methods, such as a full search-based block matching algorithm (FBMA), a three step search (TSS) algorithm, a new three-step search (NTS) algorithm, etc. may be used. A motion vector may have a motion vector value in a unit of ½ or ¼ pixel on the basis of the interpolated pixel. The motion prediction unit may predict a current prediction unit by varying a motion prediction method. As motion prediction methods, various methods, such as a skip method, a merge method, an advanced motion vector prediction (AMVP) method, an intra block copy method, etc. may be used.

The intra-prediction unit 125 may generate a prediction unit on the basis of information on a reference pixel around a current block, which is pixel information in a current picture. When a neighboring block of a current prediction unit is a block for which inter-prediction is performed, and thus a reference pixel is a pixel for which inter-prediction is performed, a reference pixel included in the block for which inter-prediction is performed may be replaced by information on a reference pixel of a neighboring block for which intra-prediction is performed. In other words, when a reference pixel is unavailable, at least one reference pixel of available reference pixels may be used in place of unavailable reference pixel information.

A prediction mode in intra-prediction may include a directional prediction mode using reference pixel information according to a prediction direction and a non-directional mode not using directional information when performing prediction. A mode for predicting luma information may be different from a mode for predicting chroma information. In order to predict the chroma information, information on an intra-prediction mode used for predicting the luma information or information on a predicted luma signal may be used.

In performing intra-prediction, when a prediction unit is identical in a size with a transform unit, intra-prediction may be performed on the prediction unit on the basis of pixels positioned at the left, the top-left, and the top of the prediction unit. However, in performing intra-prediction, when a prediction unit is different in a size with a transform unit, intra-prediction may be performed by using a reference pixel based on the transform unit. In addition, intra-prediction using N×N partitioning may be only used for the smallest coding unit.

In an intra-prediction method, a prediction block may be generated after applying an adaptive intra smoothing (AIS) filter to a reference pixel according to a prediction mode. A type of AIS filter applied to a reference pixel may vary. In order to perform an intra-prediction method, an intra prediction mode for a current prediction unit may be predicted from an intra-prediction mode of a prediction unit present around the current prediction unit. In predicting a prediction mode for a current prediction unit by using mode information predicted from a neighboring prediction unit, when an intra prediction mode for the current prediction unit is identical to an intra prediction mode of the neighboring prediction unit, information indicating that the current prediction unit and the neighboring prediction unit have the same prediction mode may be transmitted by using predetermined flag information. When a prediction mode for the current prediction unit is different from prediction modes of the neighboring prediction units, entropy encoding may be performed to encode information on a prediction mode for a current block.

In addition, a residual block may be generated which includes information on a residual value that is a difference value between a prediction unit for which prediction is performed on by the prediction unit 120 or 125, and an original block of the prediction unit. The generated residual block may be input to the transform unit 130.

The transform unit 130 may perform transform on a residual block, which includes information on a residual value between an original block and a prediction unit generated by the prediction unit 120 or 125, by using a transform method such as discrete cosine transform (DCT) or discrete sine transform (DST). In this connection, a DCT transform core includes at least one of DCT2 or DCT8 and a DST transform core includes DST7. Whether to apply DCT, or DST so as to perform transform on a residual block may be determined on the basis of information on an intra-prediction mode of a prediction unit which is used to generate the residual block. It is possible to skip a transform for a residual block. A flag indicating whether or not to skip a transform for a residual block may be encoded. A transform skip may be allowed for a residual block whose a size is smaller than or equal to a threshold value, a residual block of a luma component, or a residual block of a chroma component under 4:4:4 format.

The quantization unit 135 may perform quantization on values transformed into a frequency domain by the transform unit 130. A quantization coefficient may vary according to a block or importance of an image. Values calculated in the quantization unit 135 may be provided to the dequantization unit 140 and the rearrangement unit 160.

The rearrangement unit 160 may perform rearrangement on coefficient values with respect to quantized residual values.

The rearrangement unit 160 may change coefficients in the form of a two-dimensional block into coefficients in the form of a one-dimensional vector through a coefficient scanning method. For example, the rearrangement unit 160 may scan from a DC coefficient to a coefficient in a high frequency domain by using a zigzag scanning method so as to change the coefficients into the form of a one-dimensional vector. According to a size and an intra prediction mode of a transform unit, rather than zigzag scanning, vertical directional scanning where coefficients in the form of a two-dimensional block are scanned in a column direction, or horizontal directional scanning where coefficients in the form of two-dimensional block are scanned in a row direction may be used. In other words, which scanning method among zigzag scanning, vertical directional scanning, and horizontal directional scanning is used may be determined according to a size and an intra prediction mode of a transform unit.

The entropy encoding unit 165 may perform entropy encoding on the basis of values calculated by the rearrangement unit 160. Entropy encoding may use various encoding methods, for example, exponential Golomb coding, context-adaptive variable length coding (CAVLC), or context-adaptive binary arithmetic coding (CABAL).

The entropy encoding unit 165 may encode various types of information, such as information on a residual value coefficient and information on a block type of a coding unit, information on a prediction mode, information on a partitioning unit, information on a prediction unit, information on a partitioning unit, information on a prediction unit and information on a transmission unit, information on a motion vector, information on a reference frame, information on a block interpolation, filtering information, etc. obtained from the rearrangement unit 160 and the prediction units 120 and 125.

The entropy encoding unit 165 may entropy encode coefficients of a coding unit input from the rearrangement unit 160.

The dequantization unit 140 may perform dequantization on values quantized in the quantization unit 135, and the inverse-transform unit 145 may perform inverse-transform on values transformed in the transform unit 130. A residual value generated by the dequantization unit 140 and the inverse-transform unit 145 may be added with a prediction unit predicted by a motion estimation unit, a motion compensation unit, or the intra-prediction unit which are included in the prediction units 120 and 125 so as to generate a reconstructed block.

The filter unit 150 may include at least one of a deblocking filter, an offset correction unit, and an adaptive loop filter (ALF).

The deblocking filter may remove block distortion that occurs due to boundaries between blocks in a reconstructed picture. In order to determine whether or not to perform deblocking, whether or not to apply a deblocking filter to a current block may be determined on the basis of pixels included in several rows and columns included in a block. When a deblocking filter is applied to a block, a strong filter or a weak filter is applied according to required deblocking filtering strength. In addition, in applying a deblocking filter, when performing horizontal directional filtering and vertical directional filtering, horizontal directional filtering and vertical directional filtering may be configured to be processed in parallel.

The offset correction unit may correct an original image by an offset in a unit of a pixel with respect to an image for which deblocking is performed. In order to perform offset correction on a specific picture, a method of applying a offset to a region which is determined after partitioning pixels of the image into the predetermined number of regions, or a method of applying an offset according to edge information of each pixel may be used.

Adaptive loop filtering (ALF) may be performed on the basis of a value obtained by comparing a filtered reconstructed image with an original image. Pixels included in an image may be partitioned into predetermined groups, a filter to be applied to each of the groups may be determined, and filtering may be individually performed on each group. Information on whether or not to apply ALF and may be transmitted for each coding unit (CU) for a luma signal, and a shape and a filter coefficient of an ALF filter to be applied may vary on the basis of each block. Alternatively, an ALF filter having the same shape (fixed shape) may be applied regardless of a feature of a block to which the filter will be applied.

In the memory 155, a reconstructed block or picture calculated through the filter unit 150 may be stored. The stored reconstructed block or picture may be provided to the prediction unit 120 or 125 when performing inter-prediction.

FIG. 2 is view showing a block diagram of an image decoding apparatus (decoder) according to an embodiment of the present disclosure.

Referring to FIG. 2, an image decoding apparatus 200 may include: an entropy decoding unit 210, a rearrangement unit 215, a dequantization unit 220, an inverse-transform unit 225, prediction units 230 and 235, a filter unit 240, and a memory 245.

When an image bitstream is input from the encoder, the input bitstream may be decoded according to an inverse process of the image encoding apparatus.

The entropy decoding unit 210 may perform entropy decoding according to the inverse process of the entropy encoding by the entropy encoding unit of the image encoder. For example, in association with the methods performed by the image encoder apparatus, various methods, such as exponential Golomb coding, context-adaptive variable length coding (CAVLC), or context-adaptive binary arithmetic coding (CABAC) may be applied.

The entropy decoding unit 210 may decode information on intra-prediction and inter-prediction performed by the encoder.

The rearrangement unit 215 may perform rearrangement on the bitstream entropy decoded by the entropy decoding unit 210 on the basis of the rearrangement method used in the encoder. Coefficients represented in the form of a one-dimensional vector may be reconstructed and rearranged into coefficients in the form of a two-dimensional block. The rearrangement unit 215 may perform rearrangement through a method of receiving information related to coefficient scanning performed in the encoder and of inversely scanning on the basis of the scanning order performed in the encoder.

The dequantization unit 220 may perform dequantization on the basis of a quantization parameter received from the encoder and coefficient values of the rearranged block.

The inverse-transform unit 225 may perform, an inverse transform, that is inverse DCT or inverse DST, against to a transform, that is DCT or DST, performed on the quantization result by the transform unit in the image encoder. In this connection, a DCT transform core may include at least one of DCT2 or DCT8, and a DST transform core may include DST7. Alternatively, when the transform is skipped in the image encoder, the inverse-transform also not be performed in the inverse-transform unit 225. Inverse transform may be performed on the basis of a transmission unit determined by the image encoder. The inverse transform unit 225 of the image decoder may selectively perform a transform method (for example, DCT, or DST) according to multiple pieces of information, such as a prediction method, a size of a current block, a prediction direction, etc.

The prediction unit 230 or 235 may generate a prediction block on the basis of information related to a prediction block received from the entropy decoding unit 210 and information on a previously decoded block or picture received from the memory 245.

As described above, as the operation of the image encoder, in performing intra-prediction, when a prediction unit is identical in size with a transform unit, intra-prediction may be performed on the prediction unit on the basis of pixels positioned at the left, the top-left, and the top of the prediction unit. However, in performing intra-prediction, when a prediction unit is different in size with a transform unit, intra-prediction may be performed by using a reference pixel based on the transform unit. In addition, intra-prediction using N×N partitioning may be only used for the smallest coding unit.

The prediction units 230 and 235 may include a PU determination module, an inter-prediction unit, and an intra-prediction unit. The PU determination unit may receive various types of information, such as information on a prediction unit, information on a prediction mode of an intra-prediction method, information on a motion prediction of an inter-prediction method, etc. which are input from the entropy decoding unit 210, divide a prediction unit in a current coding unit, and determine whether inter-prediction or intra-prediction is performed on the prediction unit. By using information required in inter-prediction of a current prediction unit received from the image encoder, the inter-prediction unit 230 may perform inter-prediction on the current prediction unit on the basis of information on at least one of a previous picture and a subsequent picture of a current picture including the current prediction unit. Alternatively, inter-prediction may be performed on the basis of information on some pre-reconstructed regions in a current picture including the current prediction unit.

In order to perform inter-prediction, which method among a skip mode, a merge mode, an AMVP mode, or an intra block copy mode is used as a motion prediction method for a prediction unit included in a coding unit may be determined on the basis of the coding unit.

The intra prediction unit 235 may generate a prediction block on the basis of information on a pixel within a current picture. When a prediction unit is a prediction unit for which intra-prediction has been performed, intra-prediction may be performed on the basis of information on an intra-prediction mode of a prediction unit received from the image encoder. The intra prediction unit 235 may include an adaptive intra smoothing (AIS) filter, a reference pixel interpolation module, or a DC filter. The AIS filter may perform filtering on a reference pixel of a current block, and whether to apply the filter may be determined according to a prediction mode for a current prediction unit. A prediction mode of the prediction unit and information on an AIS filter which are received from the image encoder may be used when performing AIS filtering on a reference pixel of a current block. When a prediction mode for the current block is a mode to which AIS filtering is not applied, the AIS filter may not be applied.

When a prediction mode of a prediction unit is a prediction mode for which intra-prediction is performed on the basis of a pixel value obtained by interpolating reference pixels, the reference pixel interpolation unit may interpolate the reference pixels so as to generate a reference pixel having a unit of an integer or less. When a prediction mode for a current prediction unit is a prediction mode where a prediction block is generated without interpolating reference pixels, the reference pixels may not be interpolated. The DC filter may generate a prediction block through filtering when a prediction mode for a current block is a DC mode.

A reconstructed block or picture may be provided to the filter unit 240. The filter unit 240 may include a deblocking filter, an offset correction module, and an ALF.

Information on whether or not a deblocking filter has been applied to a corresponding block or picture and information on whether a strong filter or a weak filter is applied when the deblocking filter is applied may be received from the image encoder. The deblocking filter of the image decoder may receive information on a deblocking filter from the image encoder, and the image decoder may perform deblocking filtering on a corresponding block.

The offset correction unit may perform offset correction on a reconstructed image on the basis of a type of offset correction, information on an offset value, etc. applied to an image when performing encoding.

The ALF may be applied to a coding unit on the basis of information on whether or not to apply ALF, information on an ALF coefficient, etc. received from the encoder. The above ALF information may be provided by being included in a particular parameter set.

In the memory 245, a reconstructed picture or block may be stored so as to be used as a reference picture or reference block, and the reconstructed picture may be provided to an output unit.

FIG. 3 is a view showing a basic coding tree unit according to an embodiment of the present disclosure.

The largest coding block may be defined as a coding tree block. A single picture may be partitioned into a plurality of coding tree units (CTU). A CTU may be a coding unit of the largest size, and may be referred to as the largest coding unit (LCU). FIG. 3 is a view showing an example where a single picture is partitioned into a plurality of CTUs.

A size of a CTU may be defined in a picture level or sequence level. For the same, information representing a size of a CTU may be signaled through a picture parameter set or sequence parameter set.

In an example, a size of a CTU for the entire picture within a sequence may be set to 128×128. Alternatively, any one of 128×128 or 256×256 may be determined as a size of a CTU in a picture level. In an example, a CTU may be set to have a size of 128×128 in a first picture, and a size of 256×256 in a second picture.

Coding blocks may be generated by partitioning a CTU. A coding block represents a basic unit for performing encoding/decoding. In an example, prediction or transform may be performed for each coding block, or a prediction encoding mode may be determined for each coding block. In this connection, the prediction encoding mode represents a method of generating a prediction image. In an example, a prediction encoding mode may include intra-prediction, inter-prediction, current picture referencing (CPR), intra block copy (IBC) or combined prediction. For a coding block, a prediction block of the coding block may be generated by using a prediction encoding mode of at least one of intra-prediction, inter-prediction, current picture referencing, or combined prediction.

Information representing a prediction encoding mode for a current block may be signaled in a bitstream. In an example, the information may be a 1-bit flag representing whether a prediction encoding mode is an intra mode or an inter mode. When a prediction encoding mode for a current block is determined as an inter mode, current picture referencing or combined prediction may be available.

Current picture referencing is setting a current picture as a reference picture and obtaining a prediction block of a current block from a region that has been already encoded/decoded within a current picture. In this connection, the current picture means a picture including the current block. Information representing whether or not current picture referencing is applied to a current block may be signaled in a bitstream. In an example, the information may be a 1-bit flag. When the flag is TRUE, a prediction encoding mode for a current block may be determined as current picture referencing, and when the flag is FALSE, a prediction encoding mode for a current block may be determined as inter-prediction.

Alternatively, a prediction encoding mode for a current block may be determined on the basis of a reference picture index. In an example, when a reference picture index indicates a current picture, a prediction encoding mode for a current block may be determined as current picture referencing. When a reference picture index indicates a picture other than a current picture, a prediction encoding mode for a current block may be determined as inter-prediction. In other words, current picture referencing is a prediction method using information on a region that has been already encoded/decoded within a current picture, and inter-prediction is a prediction method using information on another picture that has been already encoded/decoded.

Combined prediction represents a combined encoding mode combining at least two of intra-prediction, inter-prediction, and current picture referencing. In an example, when combined prediction is applied, a first prediction block may be generated on the basis of any one of intra-prediction, inter-prediction or current picture referencing, and a second prediction block may be generated on the basis of another. When a first prediction block and a second prediction block are generated, a final prediction block may be generated by calculating an average or weighted sum of the first prediction block and the second prediction block. Information representing whether or not to apply combined prediction to a current block may be signaled in a bitstream. The information may be a 1-bit flag.

FIG. 4 is a view showing various partitioning types a coding block.

A coding block may be partitioned into a plurality of coding blocks on the basis of quad-tree partitioning, binary-tree partitioning or ternary tree partitioning. The partitioned coding block may be partitioned again into a plurality of coding blocks on the basis of quad-tree partitioning, binary-tree partitioning or ternary tree partitioning.

Quad-tree partitioning represents a method of partitioning a current block into four blocks. As a result of quad-tree partitioning, a current block may be partitioned into four square partitions (refer to "SPLIT_QT" of FIG. 4 (a)).

Binary-tree partitioning represents a method of partitioning a current block into two blocks. Partitioning a current block into two blocks along a vertical direction (that is, using a vertical line across the current block) may be referred to vertical directional binary-tree partitioning, and partitioning a current block into two blocks along a horizontal direction (that is, using a horizontal line across the current block) may be referred to as horizontal directional binary-tree partitioning. As a result of binary-tree partitioning, a current block may be partitioned into two non-square partitions. "SPLIT_BT_VER" of FIG. 4 (b) is a view showing a result of vertical directional binary-tree partitioning, and "SPLIT_BT_HOR" of FIG. 4 (c) is a view showing a result of horizontal directional binary-tree partitioning.

Ternary-tree partitioning represents a method of partitioning a current block into three blocks. Partitioning a current block into three blocks along a vertical direction (that is, using two vertical lines across the current block) may be referred to vertical directional ternary-tree partitioning, and partitioning a current block into three blocks along a horizontal direction (that is, using two horizontal lines across the current block) may be referred to as horizontal directional ternary-tree partitioning. As a result of ternary-tree partitioning, a current block may be partitioned into three non-square partitions. In this connection, a width/height of a partition positioned at the center of a current block may be twice than a width/height of other partitions. "SPLIT_TT_VER" of FIG. 4 (d) is a view showing a result of vertical directional ternary-tree partitioning, and "SPLIT_TT_HOR" of FIG. 4 (e) is a view showing a result of horizontal directional ternary-tree partitioning.

The number of partitioning times of a CTU may be defined as a partitioning depth. The maximum partitioning depth of a CTU may be determined in a sequence or picture level. Accordingly, the maximum partitioning depth of a CTU may vary on the basis of a sequence or picture.

Alternatively, the maximum partitioning depth may be independently determined for each partitioning method. In an example, the maximum partitioning depth where quad-tree partitioning is allowed may differ from the maximum partitioning depth where binary-tree partitioning and/or ternary-tree partitioning is allowed.

The encoder may signal information representing at least one of a partitioning type and a partitioning depth of a current block in a bitstream. The decoder may determine a partitioning type and a partitioning depth of a CTU on the basis of the information obtained by parsing a bitstream.

FIG. 5 is a view of an example showing an aspect of partitioning a CTU.

Partitioning a coding block by using quad-tree partitioning, binary-tree partitioning and/or ternary-tree partitioning may be referred to as multi-tree partitioning.

Coding blocks generated by partitioning a coding block by applying multi-tree partitioning may be referred to child coding blocks. When a partitioning depth of a coding block is k, a partitioning depth of child coding blocks is set to k+1.

To the contrary, for coding blocks having a partitioning depth of k+1, a coding block having a partitioning depth of k may be referred to as a parent coding block.

A partitioning type of a current coding block may be determined on the basis of at least one of a partitioning type of a parent coding block and a partitioning type of a neighboring coding block. In this connection, the neighboring coding block may be a block adjacent to a current coding block, and include at least one of an top neighboring block, a left neighboring block, or a neighboring block adjacent to the top-left corner of the current coding block. In this connection, the partitioning type may include whether or not to apply quad-tree partitioning, whether or not to apply binary-tree partitioning, a direction of binary-tree partitioning, whether or not to apply ternary-tree partitioning, or a direction of ternary-tree partitioning.

In order to determine a partitioning type of a coding block, information representing whether or not a coding block is partitioned may be signaled in a bitstream. The information is a 1-bit flag of "split_cu_flag", and when the flag is TRUE, it may represent that a coding block is partitioned by a multi tree partitioning method.

When split_cu_flag is TRUE, information representing whether or not a coding block is partitioned by quad-tree partitioning may be signaled in a bitstream. The information is a 1-bit flag of split_qt_flag, and when the flag is TRUE, a coding block may be partitioned into four blocks.

In an example, in an example shown in FIG. 5, a CTU is partitioned by quad-tree partitioning, and thus four coding blocks having a partitioning depth of 1 are generated. In addition, it is shown that quad-tree partitioning is applied again to the first coding block and the fourth coding block among four coding blocks generated by quad-tree partitioning. As a result, four coding blocks having a partitioning depth of 2 may be generated.

In addition, by applying again quad-tree partitioning to a coding block having a partitioning depth of 2, a coding block having a partitioning depth of 3 may be generated.

When quad-tree partitioning is not applied to a coding block, whether to perform binary-tree partitioning or ternary-tree partitioning for the coding block may be determined according to at least one of a size of the coding block, whether or not the coding block is positioned at a picture boundary, the maximum partitioning depth, or a partitioning type of a neighboring block. When it is determined to perform binary-tree partitioning or ternary-tree partitioning for the coding block, information representing a partitioning direction may be signaled in a bitstream. The information may be a 1-bit flag of mtt_split_cu_vertical_flag. Whether a partitioning direction is a vertical direction or a horizontal direction may be determined on the basis of the flag. Additionally, information representing which one of binary-tree partitioning or ternary-tree partitioning is applied to the coding block may be signaled in a bitstream. The information may be a 1-bit flag of mtt_split_cu_binary_flag. Whether binary-tree partitioning is applied to the coding block or ternary-tree partitioning is applied to the coding block may be determined on the basis of the flag.

In an example, in an example shown in FIG. 5, vertical directional binary-tree partitioning is applied to a coding block having a partitioning depth of 1, vertical directional ternary-tree partitioning is applied to a left coding block among coding blocks generated by the partitioning, and vertical directional binary-tree partitioning is applied to a right coding block.

Inter-prediction is a prediction encoding mode predicting a current block by using information on a previous picture. In an example, a block (hereinafter, collocated block) at the same position with a current block within a previous picture may be set as a prediction block of the current block. Hereinafter, a prediction block generated on the basis of a collocated block of the current block may be referred to as a collocated prediction block.

To the contrary, when an object present in a previous picture has moved to another position in a current picture, a current block may be effectively predicted by using motions of the object. For example, when a motion direction and a size of the object is determined by comparing a previous picture with a current picture, a prediction block (or prediction image) of the current block may be generated according to motion information of the objects. Hereinafter, a prediction block generated by using motion information may be referred to as a motion prediction block.

A residual block may be generated by subtracting a prediction block from a current block. In this connection, in case where an object moves, energy of a residual block may be reduced by using a motion prediction block rather than using a collocated prediction block, and thus compression performance of the residual block may be improved.

As above, generating a prediction block by using motion information may be referred to as motion estimation prediction. In the most inter-prediction, a prediction block may be generated on the basis of motion compensation prediction.

Motion information may include at least one of a motion vector, a reference picture index, a prediction direction, and a bidirectional weighting factor index. A motion vector represents a motion direction of an object and a magnitude. A reference picture index specifies a reference picture of a current block among reference pictures included in a reference picture list. A prediction direction indicates any one of uni-directional L0 prediction, uni-directional L1 prediction, or bi-directional prediction (L0 prediction and L1 prediction). At least one of L0 directional motion information and L1 directional motion information may be used according to a prediction direction of a current block. A bidirectional weighting factor index specifies a weighting factor applied to an L0 prediction block and a weighting factor applied to an L1 prediction block.

FIG. 6 is a flow diagram of an inter-prediction method according to the embodiment of the present disclosure.

In reference to FIG. 6, an inter-prediction method includes determining an inter-prediction mode for a current block S601, obtaining motion information of the current block according to the determined inter-prediction mode S602, and performing motion compensation prediction for a current block on the basis of the obtained motion information S603.

In this connection, the inter-prediction mode may represent various methods for determining motion information of a current block, and include an inter-prediction mode using translation motion information, an inter-prediction mode using affine motion information. In an example, an inter-prediction mode using translation motion information may include a merge mode and a motion vector prediction mode, and an inter-prediction mode using affine motion information may include an affine merge mode and an affine motion vector prediction mode. Motion information on a current block may be determined on the basis of a neighboring block neighboring the current block or information obtained by parsing a bitstream.

Motion information of a current block may be derived from motion information of another block. In this connection, another block may be a block encoded/decoded by inter prediction previous to the current block. Setting motion information of a current block to be the same as motion information of another block may be defined as a merge mode. Also, setting a motion vector of another block as a prediction value of a motion vector of the current block may be defined as a motion vector prediction mode.

FIG. 7 is a flow diagram of a process deriving the motion information of a current block under a merge mode.

The merge candidate of a current block may be derived S701. The merge candidate of a current block may be derived from a block encoded/decoded by inter-prediction prior to a current block.

FIG. 8 is a diagram illustrating candidate blocks used to derive a merge candidate.

The candidate blocks may include at least one of neighboring blocks including a sample adjacent to a current block or non-neighboring blocks including a sample non-adjacent to a current block. Hereinafter, samples determining candidate blocks are defined as base samples. In addition, a base sample adjacent to a current block is referred to as a neighboring base sample and a base sample non-adjacent to a current block is referred to as a non-neighboring base sample.

A neighboring base sample may be included in a neighboring column of a leftmost column of a current block or a neighboring row of an uppermost row of a current block. In an example, when the coordinate of a left-top sample of a current block is (0,0), at least one of a block including a base sample at a position of (−1, H−1), (W−1, −1), (W, −1), (−1, H) or (−1, −1) may be used as a candidate block. In reference to a diagram, the neighboring blocks of index 0 to 4 may be used as candidate blocks.

A non-neighboring base sample represents a sample that at least one of a x-axis distance or a y-axis distance with a base sample adjacent to a current block has a predefined value. In an example, at least one of a block including a base sample that a x-axis distance with a left base sample is a predefined value, a block including a non-neighboring sample that a y-axis distance with a top base sample is a predefined value or a block including a non-neighboring sample that a x-axis distance and a y-axis distance with a left-top base sample are a predefined value may be used as a candidate block. A predefined value may be a natural number such as 4, 8, 12, 16, etc. In reference to a diagram, at least one of blocks in an index 5 to 26 may be used as a candidate block.

A sample that is not positioned on the same vertical line, horizontal line, or diagonal line as the neighboring base sample may be set as the non-neighboring base sample.

FIG. 9 is a view showing positions of base samples.

As in the example shown in FIG. 9, x coordinates of top non-neighboring base samples may be set different from x coordinates of top neighboring base samples. As an example, when the position of the top neighboring base sample is (W−1, −1), the position of the top non-neighboring base sample spaced apart from the top neighboring base sample by N on the y axis is set to ((W/2)−1, −1−N) and the position of the top non-neighboring base sample spaced apart from the top neighboring base sample by 2N on the y axis is set to (0, −1−2N). That is, the position of the non-adjacent base sample may be determined on the basis of the position of the adjacent base sample and the distance to the adjacent base sample.

Hereinafter, among candidate blocks, the candidate block including the neighboring base sample is referred to as a neighboring block and the block including the non-neighboring base sample is referred to as a non-neighboring block.

When the distance between the current block and a candidate block is equal to or greater than a threshold value, the candidate block is set unavailable as a merge candidate. The threshold value may be determined on the basis of the size of a coding tree unit. As an example, the threshold value may be set to a value of the height (ctu_height) of the coding tree unit or to a value (e.g., ctu_height±N) that is obtained by adding or subtracting an offset from the height of the coding tree unit. The offset N is a value predefined in the encoder and the decoder, and may be set to 4, 8, 16, 32, or ctu_height.

When the difference between the y-axis coordinate of the current block and the y-axis coordinate of the sample included in the candidate block is greater than the threshold value, it is determined that the candidate block is unavailable as a merge candidate.

Alternatively, a candidate block not belonging to the same coding tree unit as a current block may be set to be unavailable as a merge candidate. In an example, when a base sample is out of an upper boundary of a coding tree unit to which a current block belongs, a candidate block including the base sample may be set to be unavailable as a merge candidate.

When the top boundary of the current block is adjacent to the top boundary of the coding tree unit, it is determined that multiple candidate blocks are unavailable as a merge candidate, and thus the efficiency of encoding/decoding of the current block may decrease. To solve such a problem, candidate blocks may be set so that the number of candidate blocks positioned on the left of the current block is greater than the number of candidate blocks positioned above the current block.

FIG. 10 is a view showing an example of candidate blocks used to drive a merge candidate.

As in the example shown in FIG. 10, top blocks belonging to N block columns above a current block and left blocks belonging to M block columns on the left of the current block may be set as candidate blocks. Herein, by setting M larger than N, the number of the left candidate blocks may be set larger than the number of the top candidate blocks.

As an example, the difference between the y-axis coordinate of the base sample within the current block and the y-axis coordinate of the top block available as the candidate block may be set not to exceed N times the height of the current block. In addition, the difference between the x-axis coordinate of the base sample within the current block and the x-axis coordinate of the left block available as the candidate block may be set not to exceed M times the width of the current block.

As an example, the example in FIG. 10 shows that the blocks belonging to two block columns above the current block and the blocks belonging to five block columns on the left of the current block are set as candidate blocks.

As another example, when the candidate block does not belong to the same coding tree unit as the current block, a merge candidate is derived using, instead of the candidate block, a block belonging to the same coding tree unit as the current block or using a block including a base sample adjacent to the boundary of the coding tree unit.

FIG. 11 is a view showing an example in which a position of a base sample is changed.

When a base sample is included in a different coding tree unit than a current block and the base sample is not adjacent to the boundary of the coding tree unit, instead of the base sample, a base sample adjacent to the boundary of the coding tree unit is used to determine a candidate block.

As an example, in the examples shown in FIG. 11 (*a*) and (*b*), when the top boundary of the current block is in contact with the top boundary of the coding tree unit, base samples above the current block belong to a different coding tree unit than the current block. Among the base samples belonging to a different coding tree unit than the current block, the base sample not adjacent to the top boundary of the coding tree unit may be replaced with a sample adjacent to the top boundary of the coding tree unit.

As an example, as in the example shown in FIG. 11 (*a*), the base sample at position 6 may be replaced with the sample at position 6' that is positioned at the top boundary of the coding tree unit. As in the example shown in FIG. 11 (*b*), the base sample at position 15 may be replaced with the sample at position 15' that is positioned at the top boundary of the coding tree unit. Herein, the y coordinate of the replacement sample may be changed to a position adjacent to the coding tree unit and the x-coordinate of the replacement sample may be set the same as that of the base sample. As an example, the sample at position 6' may have the same x coordinate as the sample at position 6. The sample at position 15' may have the same x-coordinate as the sample at position 15.

Alternatively, a result of adding or subtracting an offset from the x-coordinate of the base sample may be set as the x-coordinate of the replacement sample. As an example, when the neighboring base sample positioned above the current block and the non-neighboring base sample have the same x-coordinate, a result of adding or subtracting an offset from the x-coordinate of the base sample is set as the x-coordinate of the replacement sample. This is to prevent the replacement sample replacing the non-neighboring base sample from being at the same position as another non-neighboring base sample or a neighboring base sample.

FIG. 12 is a view showing an example in which a position of a base sample is changed.

In replacing a base sample that is included in a different coding tree unit than a current block and is not adjacent to a boundary of a coding tree unit, with a sample positioned at the boundary of the coding tree unit, a value obtained by adding or subtracting an offset from the x-coordinate of the base sample may be set as the x-coordinate of the replacement sample.

As an example, in the example shown in FIG. 12, a base sample at position 6 and a base sample at position 15 may be replaced with a sample at position 6' and a sample at position 15', respectively, of which the y-coordinates are the same as that of a row adjacent to an top boundary of a coding tree unit. Herein, the x-coordinate of the sample at position 6' is set to a value obtained by subtracting W/2 from the x-coordinate of the base sample at position 6. The x-coordinate of the sample at position 15' may be set to a value obtained by subtracting W−1 from the x-coordinate of the base sample at position 15.

Differently from the examples shown in FIGS. 11 and 12, the y-coordinate of the row positioned above the topmost row of the current block, or the y-coordinate of the top boundary of the coding tree unit may be set as the y coordinate of the replacement sample.

Although not shown, a sample replacing the base sample may be determined on the basis of the left boundary of the coding tree unit. As an example, when the base sample is not included in the same coding tree unit as the current block and is not adjacent to the left boundary of the coding tree unit, the base sample is replaced with a sample adjacent to the left boundary of the coding tree unit. Herein, the replacement sample may have the same y-coordinate as the base sample or may have a y-coordinate obtained by adding or subtracting an offset from the y-coordinate of the base sample.

Afterward, a block including the replacement sample may be set as a candidate block, and a merge candidate of the current block may be derived on the basis of the candidate block.

A merge candidate may be derived from a temporal neighboring block included in a picture different from a current block. In an example, a merge candidate may be derived from a collocated block included in a collocated picture. Any one of reference pictures included in a reference picture list may be set as a collocated picture. Index information identifying a collocated picture among reference pictures may be signaled in a bitstream. Alternatively, a reference picture with a predefined index among reference pictures may be determined as a collocated picture.

The motion information of a merge candidate may be set the same as the motion information of a candidate block. In an example, at least one of a motion vector, a reference picture index, a prediction direction or a bidirectional weight index of a candidate block may be set as the motion information of a merge candidate.

A merge candidate list including a merge candidate may be generated S702.

The index of merge candidates in a merge candidate list may be assigned according to the predetermined order. In an example, an index may be assigned in the order of a merge candidate derived from a left neighboring block, a merge candidate derived from a top neighboring block, a merge candidate derived from a right-top neighboring block, a merge candidate derived from a left-bottom neighboring block, a merge candidate derived from a left-top neighboring block and a merge candidate derived from a temporal neighboring block.

When a plurality of merge candidates are included in a merge candidate, at least one of a plurality of merge candidates may be selected S703. Concretely, information for specifying any one of a plurality of merge candidates may be signaled in a bitstream. In an example, information, merge idx, representing an index of any one of merge candidates included in a merge candidate list may be signaled in a bitstream.

When the number of merge candidates included in a merge candidate list is less than the threshold, a motion information candidate included in a motion information table may be added to a merge candidate list as a merge candidate. In this connection, the threshold may be the maximum number of merge candidates which may be included in a merge candidate list or a value in which an offset is subtracted from the maximum number of merge candidates. An offset may be a natural number such as 1 or 2, etc.

A motion information table includes a motion information candidate derived from a block encoded/decoded based on inter-prediction in a current picture. In an example, the motion information of a motion information candidate included in a motion information table may be set the same as the motion information of a block encoded/decoded based on inter-prediction. In this connection, motion information may include at least one of a motion vector, a reference picture index, a prediction direction or a bidirectional weight index.

A motion information candidate included in a motion information table also can be referred to as a inter region merge candidate or a prediction region merge candidate.

The maximum number of a motion information candidate which may be included in a motion information table may be predefined in an encoder and a decoder. In an example, the maximum number of a motion information candidate which may be included in a motion information table may be 1, 2, 3, 4, 5, 6, 7, 8 or more (e.g. 16).

Alternatively, information representing the maximum number of a motion information candidate which may be included in a motion information table may be signaled in a bitstream. The information may be signaled in a sequence, a picture or a slice level. The information may represent the maximum number of a motion information candidate which may be included in a motion information table. Alternatively, the information may represent difference between the maximum number of a motion information candidate which may be included in a motion information table and the maximum number of a merge candidate which may be included in a merge candidate list.

Alternatively, the maximum number of a motion information candidate which may be included in a motion information table may be determined according to a picture size, a slice size or a coding tree unit size.

A motion information table may be initialized in a unit of a picture, a slice, a tile, a brick, a coding tree unit or a coding tree unit line (a row or a column). In an example, when a slice is initialized, a motion information table is also initialized thus a motion information table may not include any motion information candidate.

Alternatively, information representing whether a motion information table will be initialized may be signaled in a bitstream. The information may be signaled in a slice, a tile, a brick or a block level. Until the information indicates the initialization of a motion information table, a pre-configured motion information table may be used.

Alternatively, information on an initial motion information candidate may be signaled in a picture parameter set or a slice header. Although a slice is initialized, a motion information table may include an initial motion information candidate. Accordingly, an initial motion information candidate may be used for a block which is the first encoding/decoding target in a slice.

Alternatively, a motion information candidate included in the motion information table of a previous coding tree unit may be set as an initial motion information candidate. In an example, a motion information candidate with the smallest index or with the largest index among motion information candidates included in the motion information table of a previous coding tree unit may be set as an initial motion information candidate.

Blocks are encoded/decoded in the order of encoding/decoding, and blocks encoded/decoded based on inter-prediction may be sequentially set as a motion information candidate in the order of encoding/decoding.

FIG. 13 is a diagram to explain the update aspect of a motion information table.

For a current block, when inter-prediction is performed S1301, a motion information candidate may be derived based on a current block S1302. The motion information of a motion information candidate may be set the same as that of a current block.

When a motion information table is empty S1303, a motion information candidate derived based on a current block may be added to a motion information table S1304.

When a motion information table already includes a motion information candidate S1303, a redundancy check for the motion information of a current block (or, a motion information candidate derived based on it) may be performed S1305. A redundancy check is to determine whether the motion information of a pre-stored motion information candidate in a motion information table is the same as the motion information of a current block. A redundancy check may be performed for all pre-stored motion information candidates in a motion information table. Alternatively, a redundancy check may be performed for motion information candidates with an index over or below the threshold among pre-stored motion information candidates in a motion information table. Alternatively, a redundancy check may be performed for the predefined number of motion information candidates. In an example, 2 motion information candidates with smallest indexes or with largest indexes may be determined as targets for a redundancy check.

When a motion information candidate with the same motion information as a current block is not included, a motion information candidate derived based on a current block may be added to a motion information table S1308. Whether motion information candidates are identical may be determined based on whether the motion information (e.g. a motion vector/a reference picture index, etc.) of motion information candidates is identical.

In this connection, when the maximum number of motion information candidates are already stored in a motion information table S1306, the oldest motion information candidate may be deleted S1307 and a motion information candidate derived based on a current block may be added to a motion information table S1308. In this connection, the oldest motion information candidate may be a motion information candidate with the largest or the smallest index.

Motion information candidates may be identified by respective index. When a motion information candidate derived from a current block is added to a motion information table, the smallest index (e.g. 0) may be assigned to the motion information candidate and indexes of pre-stored motion information candidates may be increased by 1. In this connection, When the maximum number of motion information candidates are already stored in a motion information table, a motion information candidate with the largest index is removed.

Alternatively, when a motion information candidate derived from a current block is added to a motion information table, the largest index may be assigned to the motion information candidate. In an example, when the number of pre-stored motion information candidates in a motion information table is less than the maximum value, an index with the same value as the number of pre-stored motion information candidates may be assigned to the motion information candidate. Alternatively, when the number of pre-stored motion information candidates in a motion information table is equal to the maximum value, an index subtracting 1 from the maximum value may be assigned to the motion information candidate. Alternatively, a motion information candidate with the smallest index is removed and the indexes of residual pre-stored motion information candidates are decreased by 1.

FIG. 14 is a diagram showing the update aspect of a motion information table.

It is assumed that as a motion information candidate derived from a current block is added to a motion information table, the largest index is assigned to the motion information candidate. In addition, it is assumed that the maximum number of a motion information candidate is already stored in a motion information table.

When a motion information candidate HmvpCand[n+1] derived from a current block is added to a motion information table HmvpCandList, a motion information candidate HmvpCand[0] with the smallest index among pre-stored motion information candidates may be deleted and indexes of residual motion information candidates may be decreased by 1. In addition, the index of a motion information candidate HmvpCand[n+1] derived from a current block may be set to the maximum value (for an example shown in FIG. 14, n).

When a motion information candidate identical to a motion information candidate derived based on a current block is prestored S1305, a motion information candidate derived based on a current block may not be added to a motion information table S1309.

Alternatively, while a motion information candidate derived based on a current block is added to a motion information table, a pre-stored motion information candidate identical to the motion information candidate may be removed. In this case, it causes the same effect as when the index of a pre-stored motion information candidate is newly updated.

FIG. 15 is a diagram showing an example in which the index of a pre-stored motion information candidate is updated.

When the index of a pre-stored motion information candidate identical to a motion information candidate mvCand derived from a current block is hIdx, the pre-stored motion information candidate may be removed and the index of motion information candidates with an index larger than hIdx may be decreased by 1. In an example, an example shown in FIG. 15 showed that HmvpCand[2] identical to mvCand is deleted in a motion information table HvmpCandList and an index from HmvpCand[3] to HmvpCand[n] is decreased by 1.

And, a motion information candidate mvCand derived based on a current block may be added to the end of a motion information table.

Alternatively, an index assigned to a pre-stored motion information candidate identical to a motion information candidate derived based on a current block may be updated. For example, the index of a pre-stored motion information candidate may be changed to the minimum value or the maximum value.

The motion information of blocks included in a predetermined region may be set not to be added to a motion information table. In an example, a motion information candidate derived based on the motion information of a block included in a merge processing region may not be added to a motion information table. Since the encoding/decoding order for blocks included in a merge processing region is not defined, it is improper to use motion information of any one of them for the inter-prediction of another of them. Accordingly, motion information candidates derived based on blocks included in a merge processing region may not be added to a motion information table.

Alternatively, the motion information of a block smaller than a preset size may be set not to be added to a motion information table. In an example, a motion information candidate derived based on the motion information of a coding block whose width or height is smaller than 4 or 8 or the motion information of a 4×4 sized coding block may not be added to a motion information table.

When motion compensation prediction is performed per sub-block basis, a motion information candidate may be derived based on the motion information of a representative sub-block among a plurality of sub-blocks included in a current block. In an example, when a sub-block merge candidate is used for a current block, a motion information candidate may be derived based on the motion information of a representative sub-block among sub-blocks.

The motion vector of sub-blocks may be derived in the following order. First, any one of merge candidates included in the mere candidate list of a current block may be selected and an initial shift vector (shVector) may be derived based on the motion vector of a selected merge candidate. And, a shift sub-block that a base sample is at a position of (xColSb, yColSb) may be derived by adding an initial shift vector to the position (xSb, ySb) of the base sample of each sub-block in a coding block (e.g. a left-top sample or a center sample). The below Equation 1 shows a formula for deriving a shift sub-block.

$$(x\text{ColSb}, y\text{ColSb}) = (x\text{Sb} + \text{shVector}[0] >> 4, y\text{Sb} + \text{shVector}[1] >> 4) \quad \text{[Equation 1]}$$

Then, the motion vector of a collocated block corresponding to the center position of a sub-block including (xColSb, yColSb) may be set as the motion vector of a sub-block including (xSb, ySb).

A representative sub-block may mean a sub-block including the left-top sample, center sample, right-bottom sample or left-bottom sample of a current block.

FIG. 16 is a diagram showing the position of a representative sub-block.

FIG. 16 (a) shows an example in which a sub-block positioned at the left-top of a current block is set as a representative sub-block and FIG. 16 (b) shows an example in which a sub-block positioned at the center of a current block is set as a representative sub-block. When motion compensation prediction is performed in a basis of a sub-block, the motion information candidate of a current block may be derived based on the motion vector of a sub-block including the left-top sample of a current block or including the central sample of a current block.

Based on the inter-prediction mode of a current block, it may be determined whether a current block will be used as a motion information candidate. In an example, a block encoded/decoded based on an affine motion model may be set to be unavailable as a motion information candidate. Accordingly, although a current block is encoded/decoded by inter-prediction, a motion information table may not be updated based on a current block when the inter-prediction mode of a current block is an affine prediction mode.

Alternatively, whether to use the current block as a motion information candidate may be determined on the basis of at least one of a motion vector resolution of the current block, whether a merge offset encoding method is applied, whether combined prediction is applied, or whether triangular partitioning is applied. As an example, the current block may be set unavailable as a motion information candidate in at least one of the following cases: where the motion information resolution of the current block is equal to or greater than a 2-integer pel, where combined prediction is applied to the current block, where triangular partitioning is applied to the current block, or where the merge offset encoding method is applied to the current block.

Alternatively, a motion information candidate may be derived based on at least one sub-block vector of a sub-block included in a block encoded/decoded based on an affine motion model. In an example, a motion information candidate may be derived by using a sub-block positioned at the left-top, the center or the right-top of a current block. Alternatively, the average value of the sub-block vectors of a plurality of sub-blocks may be set as the motion vector of a motion information candidate.

Alternatively, a motion information candidate may be derived based on the average value of the affine seed vectors of a block encoded/decoded based on an affine motion model. In an example, at least one average of the first affine seed vector, the second affine seed vector or the third affine seed vector of a current block may be set as the motion vector of a motion information candidate.

Alternatively, a motion information table may be constructed for each inter prediction mode or each prediction mode. For example, a motion information table for a block encoded/decoded using an intra block copy mode and a motion information table for a block encoded/decoded using an inter prediction mode may be separately constructed. Alternatively, a motion information table for a block encoded/decoded on the basis of a translation motion model and a block encoded/decoded on the basis of an affine motion model may be separately constructed. According to the prediction mode or the inter prediction mode of the current block, one of a plurality of motion information tables may be selected.

FIG. 17 is a view showing an example of generating a motion information table for each prediction mode or each inter prediction mode.

When a block is encoded/decoded based on a non-affine motion model, a motion information candidate mvCand derived based on the block may be added to a non-affine motion information table HmvpCandList. On the other hand, when a block is encoded/decoded based on an affine motion model, a motion information candidate mvAfCand derived based on the above model may be added to an affine motion information table HmvpCandList.

The affine seed vectors of the above block may be stored in a motion information candidate derived from a block encoded/decoded based on an affine motion model. Accordingly, the motion information candidate may be used as a merge candidate for deriving the affine seed vectors of a current block.

Although not shown, a motion information table for a block encoded/decoded using an intra block copy mode may be defined additionally. The motion information table for the block encoded/decoded using the intra block copy mode may also be updated according to the embodiment shown in FIG. 13. The motion information table for the block encoded/decoded using the intra block copy mode will be described later.

Alternatively, a motion information table may be constructed for each motion vector resolution. As an example, at least one of a motion information table for storing motion information wherein a motion vector resolution is a 1/16 pel, a motion information table for storing motion information wherein a motion vector resolution is a ¼ pel, a motion information table for storing motion information wherein a motion vector resolution is a ½ pel, a motion information table for storing motion information wherein a motion vector resolution is an integer pel, or a motion information table for storing motion information wherein a motion vector resolution is a 4-integer pel may be defined.

FIG. 18 is a view showing an example in which a motion information table is generated for each motion vector resolution.

When a motion vector resolution of a block has a ¼ pel, motion information, mvCand, of the block is stored in a quarter-pel motion information table, HmvpQPCandList. However, when a motion vector resolution of a block has an integer pel, motion information, mvCand, of the block is stored in an integer-pel motion information table, HmvpIPCandList. When a motion vector resolution of a block has a 4-integer pel, motion information, mvCand, of the block is stored in a 4-integer-pel motion information table, Hmvp4IPCandList.

Depending on the motion vector resolution of the current block, the motion information table may be selected, and a merge candidate of the current block may be derived. As an example, when the motion vector resolution of the current block is a ¼ pel, a quarter-pel motion information table, HmvpQPCandList, is used to derive a merge candidate of the current block. However, when the motion vector resolution of the current block is an integer pel, an integer-pel motion information table, HmvpIPCandList, is used to derive a merge candidate of the current block.

Alternatively, motion information of a block to which the merge offset encoding method is applied may be stored in a separate motion information table.

FIG. 19 is a view showing an example in which motion information of a block to which a merge offset encoding method is applied is stored in a separate motion information table.

When the merge offset vector encoding method is not applied to a block, motion information, mvCand, of the block is stored in a motion information table, HmvpCandList. Conversely, when the merge offset vector encoding method is applied to a block, motion information, mvCand, of the block is not stored in the motion information table HmvpCandList but is stored in a merge offset motion information table, HmvpMMVDCandList.

Depending on whether the merge offset vector encoding method is applied to the current block, a motion information table may be selected. As an example, when the merge offset encoding method is not applied to the current block, a merge candidate of the current block is derived using the motion information table, HmvpCandList. Conversely, when the merge offset encoding method is applied to the current block, a merge candidate of the current block is derived using the merge offset motion information table, HmvpMMVDCandList.

An additional motion information table may be defined in addition to the described motion information table. A long-term motion information table (hereinafter, referred to as the second motion information table) may be defined in addition to the above-described motion information table (hereinafter, referred to as the first motion information table). In this connection, a long-term motion information table includes long-term motion information candidates.

When both the first motion information table and the second motion information table are empty, first, a motion information candidate may be added to the second motion information table. After the number of motion information candidates available for the second motion information table reaches the maximum number, a motion information candidate may be added to the first motion information table.

Alternatively, one motion information candidate may be added to both the second motion information table and the first motion information table.

In this connection, a second motion information table which is fully filled may not perform an update any more. Alternatively, when a decoded region in a slice is over a predetermined ratio, the second motion information table may be updated. Alternatively, the second motion information table may be updated per N coding tree unit line.

On the other hand, the first motion information table may be updated whenever an encoded/decoded block is generated by inter-prediction. But, a motion information candidate added to the second motion information table may be set not to be used to update the first motion information table.

Information for selecting any one of the first motion information table or the second motion information table may be signaled in a bitstream. When the number of a merge candidate included in a merge candidate list is less than the threshold, motion information candidates included in a motion information table indicated by the information may be added to a merge candidate list as a merge candidate.

Alternatively, a motion information table may be selected based on a size of a current block, a shape of the current block, an inter-prediction mode of the current block, whether bidirectional prediction is applied to the current block, whether a motion vector is refined or whether a triangular partitioning is applied to the current block.

Alternatively, when the number of merge candidates included in a merge candidate list is less than the maximum number even though a motion information candidate included in the first motion information table is added, a motion information candidate included in the second motion information table may be added to a merge candidate list.

FIG. 20 is a diagram showing an example in which a motion information candidate included in a long-term motion information table is added to a merge candidate list.

In case that the number of a merge candidate included in a merge candidate list is less than the maximum number, a motion information candidate included in the first motion information table HmvpCandList may be added to a merge candidate list. In When the number of a merge candidate included in the merge candidate list is less than the maximum number even though motion information candidates included in the first motion information table is added to a merge candidate list, a motion information candidate included in a long-term motion information table HmvpLT-CandList may be added to the merge candidate list.

Table 1 shows a process in which motion information candidates included in a long-term information table are added to a merge candidate list.

TABLE 1

For each candidate in HMVPCandList with index HMVPLTIdx = 1. .numHMVPLTCand, the following ordered steps are repeated until combStop is equal to true
   sameMotion is set to FALSE
   If hmvpStop is equal to FALSE and numCurrMergecand is less than (MaxNumMergeCand-1), hmvpLT is set to TRUE
   If HMVPLTCandList[NumLTHmvp-HMVPLTIdx] have the same motion vectors and the same reference indices with any mergeCandList[i] with I being 0. . numOrigMergeCand-1 and TABLE 1-continued HasBeenPruned[i] equal to false, sameMotion is set to true
   If sameMotion is equal to false, mergeCandList [numCurrMergeCand++] is set to HMVPLTCandList [NumLTHmvp-HMVPLTIdx]
   If numCurrMergeCand is equal to (MaxNumMergeCand-1), hmvpLTStop is set to TRUE A motion information candidate may be set to include additional information except for motion information. In an example, at least one of a size, shape or partition information of a block may be additionally stored in a motion information candidate. When the merge candidate list of a current block is configured, only motion information candidate whose a size, shape or partition information is identical or similar to a current block among motion information candidates may be used or a motion information candidate whose a size, shape or partition information is identical or similar to a current block may be added to a merge candidate list in advance. Alternatively, a motion information table may be generated per block size, shape or partition information. The merge candidate list of a current block may be configured by using a motion information table matching the shape, size or partition information of a current block among a plurality of motion information tables.

When the number of a merge candidate included in the merge candidate list of a current block is less than the threshold, a motion information candidate included in a motion information table may be added to a merge candidate list as a merge candidate. The additional process is performed in the order reflecting sorted order of indexes of motion information candidates in ascending or descending order. In an example, a motion information candidate with the largest index may be first added to the merge candidate list of a current block.

When a motion information candidate included in a motion information table is added to a merge candidate list, a redundancy check between a motion information candidate and pre-stored merge candidates in the merge candidate list may be performed. As a result of a redundancy check, a motion information candidate with the same motion information as a pre-stored merge candidate may not be added to the merge candidate list.

In an example, Table 2 shows a process in which a motion information candidate is added to a merge candidate list.

TABLE 2

For each candidate in HMVPCandList with index HMVPIdx = 1. . numCheckedHMVPCand, the following ordered steps are repeated until combStop is equal to true
   sameMotion is set to false
   If HMVPCandList[NumHmvp-HMVPIdx] have the same motion vectors and the same reference indices with any mergeCandList[i] with I being 0. . numOrigMergeCand-1 and HasBeenPruned[i] equal to false, sameMotion is set to true
   If sameMotion is equal to false, mergeCandList [numCurrMergeCand++]is set to HMVPCandList [NumHmvp-HMVPIdx]
   If numCurrMergeCand is equal to (MaxNumMergeCand-1), hmvpStop is set to TRUE A redundancy check may be performed only for a part of motion information candidates included in a motion information table. In an example, a redundancy check may be performed only for a motion information candidate with an index over or below the threshold. Alternatively, a redundancy check may be performed only for N motion information candidates with the largest index or the smallest index.

Alternatively, a redundancy check may be performed only for a part of pre-stored merge candidates in a merge candidate list. In an example, a redundancy check may be performed only for a merge candidate whose index is over or below the threshold or a merge candidate derived from a block at a specific position. In this connection, a specific position may include at least one of the left neighboring block, the top neighboring block, the right-top neighboring block or the left-bottom neighboring block of a current block.

FIG. 21 is a diagram showing an example in which a redundancy check is performed only for a part of merge candidates.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

Unlike a shown example, when a motion information candidate HmvpCand[j] is added to a merge candidate list, a redundancy check with 2 merge candidates with the smallest index may be performed for a motion information candidate. For example, it may be checked whether merge-CandList[0] and mergeCandList[1] are identical to Hmvp-Cand[j].

Alternatively, a redundancy check may be performed only for a merge candidate derived from a specific position. In an example, a redundancy check may be performed for at least one of a merge candidate derived from a neighboring block positioned at the left of a current block or at the top of a current block. When there is no merge candidate derived from a specific position in a merge candidate list, a motion information candidate may be added to a merge candidate list without a redundancy check.

When a motion information candidate HmvpCand[j] is added to a merge candidate list, a redundancy check with 2 merge candidates with the largest index, mergeCandList [NumMerge-2] and mergeCandList[NumMerge-1], may be performed for a motion information candidate. In this connection, NumMerge may show the number of an available spatial merge candidate and a temporal merge candidate.

A redundancy check with a merge candidate may be performed only for a part of motion information candidates. In an example, a redundancy check may be performed only for N motion information candidates with a large or a small index among motion information candidates included in a motion information table. In an example, a redundancy check may be performed only for motion information candidates with an index that the number and difference of motion information candidates included in a motion information table are below the threshold. When the threshold is 2, a redundancy check may be performed only for 3 motion information candidates with the largest index value among motion information candidates included in a motion information table. A redundancy check may be omitted for motion information candidates except for the above 3 motion information candidates. When a redundancy check is omitted, a motion information candidate may be added to a merge candidate list regardless of whether the same motion information as a merge candidate is exist or not.

Conversely, a redundancy check is set to be performed only for motion information candidates with an index that the number and difference of motion information candidates included in a motion information table are over the threshold.

The number of a motion information candidate that a redundancy check is performed may be redefined in an encoder and a decoder. In an example, the threshold may be an integer such as 0, 1 or 2.

Alternatively, the threshold may be determined based on at least one of the number of a merge candidate included in a merge candidate list or the number of motion information candidates included in a motion information table.

When a merge candidate identical to the first motion information candidate is found, a redundancy check with the merge candidate identical to the first motion information candidate may be omitted in a redundancy check for the second motion information candidate.

FIG. 22 is a diagram showing an example in which a redundancy check with a specific merge candidate is omitted.

When a motion information candidate HmvpCand[i] whose index is i is added to a merge candidate list, a redundancy check between the motion information candidate and pre-stored merge candidates in a merge candidate list is performed. In this connection, when a merge candidate mergeCandlist[j] identical to a motion information candidate HmvpCand[i] is found, a redundancy check between a motion information candidate HmvpCand[i−1] whose index is i−1 and merge candidates may be performed without adding the motion information candidate HmvpCand[i] to a merge candidate list. In this connection, a redundancy check between the motion information candidate HmvpCand[i−1] and the merge candidate mergeCandList[j] may be omitted.

In an example, in an example shown in FIG. 22, it was determined that HmvpCand[i] and mergeCandList[2] are identical. Accordingly, a redundancy check for HmvpCand [i−1] may be performed without adding HmvpCand[i] to a merge candidate list. In this connection, a redundancy check between HmvpCand[i−1] and mergeCandList[2] may be omitted.

When the number of a merge candidate included in the merge candidate list of a current block is less than the threshold, at least one of a pairwise merge candidate or a zero merge candidate may be additionally included except for a motion information candidate. A pairwise merge candidate means a merge candidate having a value obtained from averaging the motion vectors of more than 2 merge candidates as a motion vector and a zero merge candidate means a merge candidate whose motion vector is 0.

For the merge candidate list of a current block, a merge candidate may be added in the following order.

Spatial merge candidate—Temporal merge candidate—Motion information candidate—(Affine motion information candidate)—Pairwise merge candidate—Zero merge candidate A spatial merge candidate means a merge candidate derived from at least one of a neighboring block or a non-neighboring block and a temporal merge candidate means a merge candidate derived from a previous reference picture. An affine motion information candidate represents a motion information candidate derived from a block encoded/decoded by an affine motion model.

A motion information table may be used in a motion vector prediction mode. In an example, when the number of a motion vector prediction candidate included in the motion vector prediction candidate list of a current block is less than the threshold, a motion information candidate included in a motion information table may be set as a motion vector prediction candidate for a current block. Concretely, the motion vector of a motion information candidate may be set as a motion vector prediction candidate.

If any one of motion vector prediction candidates included in the motion vector prediction candidate list of a current block is selected, a selected candidate may be set as a motion vector predictor of a current block. Then, after the motion vector residual value of a current block is decoded, the motion vector of a current block may be obtained by adding up the motion vector predictor and the motion vector residual value.

The motion vector prediction candidate list of a current block may be configured in the following order.

Spatial motion vector prediction candidate—Temporal motion vector prediction candidate—Motion information candidate—(Affine motion information candidate)—Zero motion vector prediction candidate A spatial motion vector prediction candidate means a motion vector prediction candidate derived from at least one of a neighboring block or a non-neighboring block and a temporal motion vector prediction candidate means a motion vector prediction candidate derived from a previous reference picture. An affine motion information candidate represents a motion information candidate derived from a block encoded/decoded by an affine motion model. A zero motion vector prediction candidate represents a candidate that the value of a motion vector is 0.

A merge processing region larger than a coding block may be defined. Coding blocks included in a merge processing region may be processed in parallel without being sequentially encoded/decoded. In this connection, not being sequentially encoded/decoded means the order of encoding/decoding is not defined. Accordingly, the encoding/decoding process of blocks included in a merge processing region may be independently processed. Alternatively, blocks included in a merge processing region may share merge candidates. In this connection, the merge candidates may be derived based on a merge processing region.

According to the above-mentioned feature, a merge processing region may be referred to as a parallel processing region, a shared merge region (SMR) or a merge estimation region (MER).

A merge candidate of a current block may be derived based on a coding block. But, when a current block is included in a merge processing region larger than the current block, a candidate block included in the same merge processing region as the current block may be set to be unavailable as a merge candidate.

FIG. 23 is a diagram showing an example in which a candidate block included in the same merge processing region as a current block is set to be unavailable as a merge candidate.

In an example shown in FIG. 23 (a), in the decoding/decoding of CU5, blocks including base samples adjacent to CU5 may be set as candidate blocks. In this connection, candidate blocks X3 and X4 included in the same merge processing region as CU5 may be set to be unavailable as a merge candidate of CU5. But, candidate blocks X0, X1 and X2 not included in the same merge processing region as CU5 may be set to be available as a merge candidate.

In an example shown in FIG. 23 (b), in the decoding/decoding of CU8, blocks including base samples adjacent to CU8 may be set as candidate blocks. In this connection, candidate blocks X6, X7 and X8 included in the same merge processing region as CU8 may be set to be unavailable as a merge candidate. But, candidate blocks X5 and X9 not included in the same merge processing region as CU8 may be set to be available as a merge candidate.

Alternatively, when a current block is included in a merge processing region, a neighboring block adjacent to a current block and to a merge processing region may be set as a candidate block.

FIG. 24 is a diagram showing an example which derives a merge candidate for a current block when a current block is included in a merge processing region.

As in an example shown in FIG. 24 (a), neighboring blocks adjacent to a current block may be set as candidate blocks for deriving the merge candidate of the current block. In this connection, a candidate block included in the same merge processing region as the current block may be set to be unavailable as a merge candidate. In an example, in deriving a merge candidate for a coding block CU3, a top neighboring block y3 and a right-top neighboring block y4 included in the same merge processing region as the coding block CU3 may be set to be unavailable as a merge candidate of the coding block CU3.

By scanning neighboring blocks adjacent to a current block in the predefined order, a merge candidate may be derived. In an example, the predefined order may be the order of y1, y3, y4, y0 and y2.

When the number of merge candidates which may be derived from neighboring blocks adjacent to a current block is less than a value that an offset is subtracted from the maximum number of merge candidates or the maximum number, a merge candidate for the current block may be derived by using neighboring blocks adjacent to a merge processing region like an example shown in FIG. 24 (b). In an example, neighboring blocks adjacent to a merge processing region including a coding block CU3 may be set as candidate blocks for the coding block CU3. In this connection, neighboring blocks adjacent to a merge processing region may include at least one of a left neighboring block x1, a top neighboring block x3, a left-bottom neighboring block x0, a right-top neighboring block x4 or a left-top neighboring block x2.

By scanning neighboring blocks adjacent to a merge processing region in the predefined order, a merge candidate may be derived. In an example, the predefined order may be the order of x1, x3, x4, x0 and x2.

In summary, a merge candidate on the coding block CU3 including in a merge processing region may be derived by scanning candidate blocks in the following scanning order.

(y1, y3, y4, y0, y2, x1, x3, x4, x0, x2)

But, the scanning order of the above-illustrated candidate blocks only shows the example of the present disclosure and candidate blocks may be scanned in the order different from the above example. Alternatively, the scanning order may be adaptively determined based on at least one of a size or a shape of a current block or a merge processing region.

A merge processing region may be square or non-square. Information for determining a merge processing region may be signaled in a bitstream. The information may include at least one of information representing the shape of a merge processing region or information representing the size of a merge processing region. When a merge processing region is non-square, at least one of information representing the size of a merge processing region, information representing the width or height of a merge processing region or information representing a ratio between the width and height of a merge processing region may be signaled in a bitstream.

The size of a merge processing region may be determined based on at least one of information signaled in a bitstream, picture resolution, the size of a slice or the size of a tile.

If motion compensation prediction is performed for a block included in a merge processing region, a motion information candidate derived based on the motion information of a block in which motion compensation prediction is performed may be added to a motion information table.

But, if a motion information candidate derived from a block included in a merge processing region is added to a motion information table, a case may occur where a motion information candidate derived from the block is used in the encoding/decoding of other block in the merge processing region whose encoding/decoding is actually slower than the block. In other words, although dependence between blocks should be excluded in the encoding/decoding of blocks included in a merge processing region, a case may occur where motion prediction compensation is performed by using the motion information of other block included in the merge processing region. To solve such a problem, although the encoding/decoding of a block included in a merge processing region is completed, the motion information of the block whose encoding/decoding is completed may not be added to a motion information table.

Alternatively, the motion information table may be updated using only a block at a predefined position within a merge processing region. The examples of the predefined position may include at least one of a block positioned on the top left of the merge processing region, a block positioned on the top right of the merge processing region, a block positioned on the bottom left of the merge processing region, a block positioned on the bottom right of the merge processing region, a block positioned in the center of the merge processing region, a block adjacent to the right boundary of the merge processing region, and a block adjacent to the bottom boundary of the merge processing region. As an example, the motion information table may be updated only with motion information of a block adjacent to the bottom right corner of the merge processing region and the motion information table may not be updated with motion information of other blocks.

Alternatively, after decoding of all blocks included in the merge processing region is completed, a motion information candidate derived from the blocks may be added to the motion information table. That is, while the blocks included in the merge processing region are encoded/decoded, the motion information table may not be updated.

In an example, if motion compensation prediction is performed for blocks included in a merge processing region, a motion information candidate derived from the blocks may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a motion information candidate including a unidirectional motion information may be added to a motion information table before a motion information candidate including a bidirectional motion information. On the contrary, a motion information candidate including a bidirectional motion information may be added to a motion information table before a motion information candidate including a unidirectional motion information.

Alternatively, a motion information candidate may be added to a motion information table in the order of high frequency of use or low frequency of use in a merge processing region or a coding tree unit.

When a current block is included in a merge processing region and the number of merge candidates included in a merge candidate list of the current block is less than the maximum number, a motion information candidate included in a motion information table may be added to the merge candidate list. In this connection, a motion information candidate derived from a block included in the same merge processing region as a current block may be set not to be added to the merge candidate list of the current block.

Alternatively, when a current block is included in a merge processing region, it may be set not to use a motion information candidate included in a motion information table. In other words, although the number of merge candidates included in a merge candidate list of the current block is less than the maximum number, a motion information candidate included in a motion information table may not be added to the merge candidate list.

In another example, a motion information table on a merge processing region or a coding tree unit may be configured. This motion information table plays a role of temporarily storing the motion information of blocks included in a merge processing region. To distinguish between a general motion information table and a motion information table for a merge processing region or a coding tree unit, the motion information table for the merge processing region or the coding tree unit is referred to as a temporary motion information table. And, a motion information candidate stored in the temporary motion information table is referred to as a temporary motion information candidate.

FIG. 25 is a diagram showing a temporary motion information table.

A temporary motion information table for a coding tree unit or a merge processing region may be configured. When motion compensation prediction is performed for a current block included in a coding tree unit or a merge processing region, the motion information of the block may not be added to a motion information table HmvpCandList. Instead, a temporary motion information candidate derived from the block may be added to a temporary motion information table HmvpMERCandList. In other words, a temporary motion information candidate added to a temporary motion information table may not be added to a motion information table. Accordingly, a motion information table may not include a motion information candidate derived based on motion information of blocks included in a coding tree unit or a merge processing region including a current block.

Alternatively, only motion information of some of the blocks included in the merge processing region may be added to the temporary motion information table. As an example, only blocks at predefined positions within the merge processing region may be used for updating the motion information table. The predefined positions may include at least one of a block positioned on the top left of the merge processing region, a block positioned on the top right of the merge processing region, a block positioned on the bottom left of the merge processing region, a block positioned on the bottom right of the merge processing region, a block positioned in the center of the merge processing region, a block adjacent to the right boundary of the merge processing region, and a block adjacent to the bottom boundary of the merge processing region. As an example, only motion information of a block adjacent to the bottom right corner of the merge processing region may be added to the temporary motion information table and motion information of other blocks may not be added to the temporary motion information table.

The maximum number of temporary motion information candidates that the temporary motion information table is able to include may be set equal to the maximum number of motion information candidates that the motion information table is able to include. Alternatively, the maximum number of temporary motion information candidates that the temporary motion information table is able to include may be determined according to the size of the coding tree unit or the merge processing region. Alternatively, the maximum number of temporary motion information candidates that the temporary motion information table is able to include may be set smaller than the maximum number of motion information candidates that the motion information table is able to include.

A current block included in a coding tree unit or a merge processing region may be set not to use a temporary motion information table on the corresponding coding tree unit or merge processing region. In other words, when the number of merge candidates included in the merge candidate list of the current block is less than the threshold, a motion information candidate included in a motion information table may be added to the merge candidate list and a temporary motion information candidate included in a temporary motion information table may not be added to the merge candidate list. Accordingly, the motion information of other block including in the same coding tree unit or the same merge processing region as the current block may not be used for the motion compensation prediction of the current block.

If the encoding/decoding of all blocks included in a coding tree unit or a merge processing region is completed, a motion information table and a temporary motion information table may be unified.

FIG. 26 is a diagram showing an example in which a motion information table and a temporary motion information table are unified.

If the encoding/decoding of all blocks included in a coding tree unit or a merge processing region is completed, a temporary motion information candidate included in a temporary motion information table may be updated in a motion information table as in an example shown in FIG. 26.

In this connection, temporary motion information candidates included in a temporary motion information table may be added to a motion information table in the order inserted in the temporary motion information table. (In other words, in the ascending order or the descending order of the index value)

In another example, temporary motion information candidates included in a temporary motion information table may be added to a motion information table in the predefined order. In this connection, the predefined order may be determined in the scanning order of coding blocks in a merge processing region or a coding tree unit. The scanning order may be at least one of raster scanning, horizontal scanning, vertical scanning or zigzag scanning. Alternatively, the predefined order may be determined based on the motion information of each block or the number of blocks with the same motion information.

Alternatively, a temporary motion information candidate including a unidirectional motion information may be added to a motion information table before a temporary motion information candidate including a bidirectional motion information. On the contrary, a temporary motion information candidate including a bidirectional motion information may be added to a motion information table before a temporary motion information candidate including a unidirectional motion information.

Alternatively, a temporary motion information candidate may be added to a motion information table in the order of high frequency of use or low frequency of use in a merge processing region or a coding tree unit.

In case that a temporary motion information candidate included in a temporary motion information table is added to a motion information table, a redundancy check for a temporary motion information candidate may be performed. In an example, when the same motion information candidate as a temporary motion information candidate included in a temporary motion information table is prestored in a motion information table, the temporary motion information candidate may not be added to the motion information table. In this connection, a redundancy check may be performed for a part of motion information candidates included in a motion information table. In an example, a redundancy check may be performed for motion information candidates with an index over or below the threshold. In an example, when a temporary motion information candidate is equal to a motion information candidate with an index over the predefined value, the temporary motion information candidate may not be added to a motion information table.

It may limit the use of a motion information candidate derived from a block included in the same coding tree unit or the same merge processing region as a current block as the merge candidate of the current block. For it, the address information of a block may be additionally stored for a motion information candidate. The address information of a block may include at least one of the position of the block, the address of the block, the index of the block, the position of a merge processing region in which the block is included, the address of a merge processing region in which the block is included, the index of a merge processing region in which the block is included, the position of a coding tree region in which the block is included, the address of a coding tree region in which the block is included or the index of a coding tree region in which the block is included.

The intra block copy (IBC) mode is for predicting a current block from a region that is reconstructed before the current block in the current picture. Specifically, a prediction sample of the current block may be obtained using a reference block in a pre-reconstructed region in the current picture.

Information indicating whether to use the intra block copy mode may be signaled through a bitstream. For example, a flag, pred_ibc_flag, indicating whether the intra block copy mode is applied to the current block may be signaled through a bitstream.

When signaling of the flag, pred_ibc_flag, is omitted, whether the intra block copy mode is used is determined on the basis of at least one of a size, a shape, or an encoding mode of the current block, or a slice type. For example, when the current block is in a 4×4 size or when the encoding mode of the current block is an intra mode, whether the IBC mode is applied is determined on the basis of whether a skip mode is applied to the current block. Specifically, when the current block is in a 4×4 size or when the encoding mode of the current block is an intra mode, the current block is predicted by replacing the skip mode with the IBC mode. That is, when the current block is in a 4×4 size or when the encoding mode of the current block is an intra mode, a reconstructed block for the current block is derived by using the current picture as a reference picture. A flag, cu skip flag, indicating whether the skip mode is applied may be signaled through a bitstream. When the skip mode is applied, a prediction sample of the current block is set as a reconstructed sample.

When the size of the current block is greater than a threshold value, the IBC mode is set unavailable. The threshold value may be 64×64 or 128×128. Alternatively, whether the intra block copy mode is used or not may be determined according to the size, a temporal ID, or a color component of the current picture.

FIG. 27 is a view showing a prediction aspect based on an intra block copy mode.

A difference in coordinates between a current block and a reference block may be defined as a motion vector. In particular, a motion vector under an intra block mode may be referred to as a block vector (BV). For example, a difference dX between an x coordinate of an top left sample of a current block and an x coordinate of an top left sample of a reference block may be defined as a horizontal direction block vector (or x-axis block vector), and a difference between a y coordinate of the top left sample of the current block and a y coordinate of the top left sample of the reference block may be defined as a vertical direction block vector (or y-axis block vector).

Hereinafter, the intra block copy mode will be described in detail with reference to the figure.

FIG. 28 is a flowchart showing a process of predicting a current block on the basis of an intra block copy mode according to an embodiment of the present disclosure.

First, a block vector of a current block may be derived S2801. The block vector of the current block may be derived on the basis of neighboring blocks adjacent to the current block. Specifically, the block vector of the current block may be derived by setting a block vector of the neighboring block identical to the block vector of the current block or by adding a difference vector to the block vector of the neighboring block.

Methods of deriving a motion vector under the inter prediction mode may be applied to derive a block vector under the intra block copy mode. For example, by applying a merge mode to the current block, a block vector of a neighboring block may be set as a block vector of the current block. Alternatively, by applying a motion vector prediction mode to the current block, a difference vector is added to a block vector of a neighboring block, so that a block vector of the current block is derived.

For convenience of description, elements used to derive a block vector under the intra block copy mode will be prefixed with "IBC". For example, the merge mode and the motion vector prediction mode under the intra block copy mode are referred to as an IBC merge mode and an IBC motion vector prediction mode, respectively. Unless otherwise described, the above-described embodiments for the inter prediction mode may also be applied to the intra block copy mode. For example, a method of deriving a merge candidate and a method of updating a motion information table under the inter prediction mode may be applied for derivation of an IBC merge candidate and for an update on an IBC motion information table.

In addition, when it is necessary to distinguish between the inter prediction mode and the intra block copy mode, elements used to derive a motion vector under the inter prediction mode will be prefixed with "general".

Information indicating whether the IBC merge mode is applied to the current block may be signaled through a bitstream. For example, a flag, IBC_merge_flag, may be signaled through a bitstream. The flag, IBC_merge_flag, having a value of 1 indicates that the IBC merge mode is applied to the current block, and the flag, IBC_merge_flag, having a value of 0 indicates that the IBC merge mode is not applied to the current block. The flag, IBC_merge_flag, may be signaled when there is at least one or more available IBC merge candidates.

When the flag, IBC_merge_flag, has a value of 0, the IBC motion vector prediction mode is applied to the current block.

Under the IBC merge mode, a block vector of the current block may be derived from at least one of neighboring blocks adjacent to the current block. Herein, the neighboring blocks may include at least one of an top neighboring block adjacent to the top of the current block, a left neighboring block adjacent to the left of the current block, a bottom left neighboring block adjacent to the bottom left corner of the current block, an top right neighboring block adjacent to the top right corner of the current block, and an top left neighboring block adjacent to the top left corner of the current block.

Specifically, a block vector of the current block may be derived from the neighboring block encoded using the intra block copy mode among the neighboring blocks adjacent to the current block. A block vector of an available neighboring block that is found first among the neighboring blocks adjacent to the current block may be derived as a block vector of the current block.

Alternatively, IBC merge candidates may be derived from neighboring blocks encoded using the intra block copy mode adjacent to the current block, and a block vector of the current block may be derived from one of the IBC merge candidates. An IBC merge candidate may also be derived using a collocated block of the current block. An IBC merge candidate may also be derived using blocks not adjacent to the current block.

The IBC merge candidates may be added to the IBC merge candidate list according to a predefined order.

FIG. 29 is a view showing an example of an order of adding IBC merge candidates to an IBC merge candidate list.

When the coordinates of the top left sample of the current block are (0, 0), block A1 refers to a block including a base sample at position (−1, H−1), block B1 refers to a block including a base sample at position (W−1, −1), block B0 refers to a block including a base sample at position (W, −1), block A0 refers to a block including a base sample at position (−1, H), and block B2 refers to a block including a base sample at position (−1, −1). In the order of A1, B1, B0, A0, and B2, IBC merge candidates may be added to the IBC merge candidate list.

Alternatively, the IBC merge candidate list may be constructed in a different order. For example, the IBC merge candidate list may be constructed in the order of B1, B0, A1, A0, and B2, or in the order of B1, A1, B0, A0, and B2.

Alternatively, an IBC merge candidate may be derived using only one of candidate blocks positioned on the top of the current block and using only one of candidate blocks positioned on the left of the current block. For example, an IBC merge candidate may be derived using only blocks A1 and B1.

Alternatively, depending on the size or the shape of the current block, the numbers or the positions of neighboring blocks used to derive an IBC merge candidate may be set different. For example, the number of available neighboring blocks may be zero, one, two, three, four, or five depending on the size of the current block.

When an IBC merge candidate list includes a plurality of IBC merge candidates, index information for specifying any one of the plurality of IBC merge candidates is signaled through a bitstream. For example, a block vector of the current block may be derived from the IBC merge candidate specified by a syntax element, IBC_merge_idx.

A block vector of a chrominance component may be derived by scaling a block vector of a luminance component. Scaling may be performed by bit shifting the block vector of the luminance component to the right by a shifting variable. The shifting variable may be determined according to a color format.

The maximum number of IBC merge candidates that the IBC merge candidate list is able to include may be predefined in the encoder and the decoder. For example, the maximum number of merge candidates that the IBC merge candidate list is able to include may be set to four, five, or six.

Alternatively, the maximum number of IBC merge candidates that the IBC merge candidate list is able to include may be set equal to the maximum number of merge candidates that a general merge candidate list is able to include. For example, a syntax element, six_minus_max_num_merge_cand, indicating the maximum number of merge candidates that the general merge candidate list is able to include may be signaled through a bitstream. The maximum number of merge candidates that the general merge candidate list is able to include and the maximum number of IBC merge candidates that the IBC merge candidate list is able to include may be derived by subtracting a value indicated by the syntax element, six_minus_max_num_merge_cand, from 6.

Alternatively, a syntax element indicating the maximum number of IBC merge candidates that the IBC merge candidate list is able to include and a syntax element indicating the maximum number of merge candidates that the general merge candidate list is able to include may be defined individually. For example, the maximum number of IBC merge candidates that the IBC merge candidate list is able to include may be determined by a syntax element, six_minus_max_IBC_num_merge_cand. The maximum number of merge candidates that the general merge candidate list is able to include may be determined by a syntax element, six_minus_max_num_merge_cand.

Alternatively, information indicating the difference between the maximum number of IBC merge candidates that the IBC merge candidate list is able to include and the maximum number of merge candidates that the general merge candidate list is able to include may be signaled through a bitstream. For example, a syntax element, diff_num_IBC_merge_cand, indicating the maximum number of merge candidates that the general merge candidate list is able to include and the maximum number of IBC merge candidates that the IBC merge candidate list is able to include may be signaled through a bitstream. The maximum number of IBC merge candidates that the IBC merge candidate list is able to include may be derived by subtracting a value indicated by the syntax element diff_num_IBC_merge_cand from the maximum number of merge candidates that the general merge candidate list is able to include.

Alternatively, the maximum number of IBC merge candidates that the IBC motion information table is able to include may have the same value as the maximum number of general motion information candidates that a general motion information table is able to include.

When the number of IBC merge candidates derived from at least one neighboring block is smaller than a threshold value, an IBC motion information candidate included in the IBC motion information table is added to the IBC merge candidate list as an IBC merge candidate. Herein, the threshold value may be the maximum number of IBC merge candidates that the IBC merge candidate list is able to include or a value obtained by subtracting an offset from the maximum number of IBC merge candidates. The offset may be a natural number of 1, 2, or the like.

FIG. 30 is a view showing an example of adding an IBC motion information candidate to an IBC merge candidate list.

In the shown example, the expression IBCMergeCandList[i] denotes an IBC merge candidate of which an index is i, and the expression HIbcCandList[j] denotes an IBC motion information candidate of which an index is j.

When the number of IBC merge candidates that the IBC merge candidate list includes is smaller than a threshold value, an IBC motion information candidate included in the IBC motion information table is added to the IBC merge candidate list. For example, assuming that the threshold value is 5, in FIG. 30 (a), the number of IBC merge candidates that the IBC merge candidate list includes is two, so the number of IBC merge candidates is smaller than the threshold value.

Accordingly, IBC motion information candidates that the IBC motion information table includes may be added to the IBC merge candidate list as IBC merge candidates. For example, FIG. 30 (b) shows that three IBC motion information candidates are added to the IBC merge candidate list.

When there is an IBC merge candidate having the same block vector as an IBC motion information candidate, the IBC motion information candidate is not added to the IBC merge candidate list. A redundancy check target is the same as the example described in a method of checking for redundancy between a general motion information candidate and a general merge candidate.

Even though an IBC motion information candidate is added to the IBC merge candidate list, when the number of IBC merge candidates included in the IBC merge candidate list is still smaller than the threshold value, an IBC merge candidate is derived from the general merge candidate or the general motion information candidate. Specifically, after deriving a block vector on the basis of a motion vector of the general merge candidate or a motion vector of the general motion information candidate, an IBC merge candidate having the derived block vector as motion information is added to the IBC merge candidate list. The block vector may be derived by scaling the motion vector. Scaling may be performed on the basis of a difference in output order between a reference picture and a current picture of the general merge candidate or the general motion information candidate. When the general motion information has a bi-directional motion vector, any one among L0 motion information and L1 motion information is selected, or one with a smaller difference in output order with the current picture is selected among L0 motion information and L1 motion information.

Alternatively, even though an IBC motion information candidate is added to the IBC merge candidate list, when the number of IBC merge candidates included in the IBC merge candidate list is still smaller than the threshold value, a zero block vector is added to the IBC merge candidate list. The zero block vector refers to a block vector of which a horizontal direction component and a vertical direction component are zero.

In the intra block copy mode, deriving an IBC merge candidate from neighboring blocks adjacent to the current block may be omitted and the IBC merge candidate list may be constructed using the IBC motion information table.

Whether to derive an IBC merge candidate from neighboring blocks may be determined on the basis of the size or the shape of the current block. For example, when the size of the current block is smaller than a threshold value, deriving an IBC merge candidate from neighboring blocks is omitted and the IBC merge candidate list is constructed using the IBC motion information table. In this connection, the threshold value may refer to at least one among the width, the height, and the number of samples. For example, when the number of samples included in the current block is equal to or smaller than 16, deriving an IBC merge candidate from neighboring blocks is omitted and the IBC merge candidate list is constructed using the IBC motion information table. That is, when the size of the current block is equal to or smaller than the threshold value, a block vector of the current block is derived using only the IBC motion information table. As described above, the method of deriving the block vector by using only the IBC motion information table may be referred to as an intra block copy motion information encoding method.

The IBC motion information table may include an IBC motion information candidate derived from blocks encoded/decoded using the intra block copy mode. For example, motion information of the IBC motion information candidate included in the IBC motion information table may be set equal to motion information of a block encoded/decoded on the basis of the intra block copy mode. In this connection, the motion information may include at least one among a block vector, motion vector resolution, and whether the IBC merge mode is applied (e.g., a value of the flag, IBC_merge_flag).

FIG. 31 is a view showing an update aspect of an IBC motion information table.

An IBC motion information candidate may be derived from a block encoded/decoding using the intra block copy mode or the IBC merge mode, and the derived IBC motion information candidate may be added to an IBC motion information table, HIbcCandList. For example, a block vector may be added to the IBC motion information table according to the encoding/decoding order of blocks.

When the number of IBC motion information candidates included in the IBC motion information table is smaller than the maximum number, a block vector of an encoded/decoded block is added to the IBC motion information table as a new IBC motion information candidate. However, when the number of IBC motion information candidates included in the IBC motion information table is the maximum number, one of the IBC motion information candidates included in the IBC motion information table is removed and a block vector of an encoded/decoded block is added to the IBC motion information table. For example, in the example shown in FIG. 31, when a block vector of block B4 is intended to be added to the IBC motion information table, the IBC motion information candidate having the lowest index is removed from the IBC motion information table.

The maximum number of IBC motion information candidates that the IBC motion information table is able to include may be predefined in the encoder and the decoder. For example, the maximum number of IBC motion information candidates that the IBC motion information table is able to include may be set to one, two, three, four, five, six, or the like.

Alternatively, information indicating the maximum number of IBC motion information candidates that the IBC motion information table is able to include may be signaled through a bitstream. The information may indicate the maximum number of IBC motion information candidates that the IBC motion information table is able to include, or a difference between the maximum number of IBC motion information candidates that the IBC motion information table is able to include and the maximum number of general motion information candidates that the general motion information table is able to include. The information may be signaled at a level of a picture, a slice, or a sequence.

After encoding/decoding of the current block is completed, a block vector of the current block is added to the IBC motion information table. Herein, when the IBC motion information candidate identical to the block vector of the current block is already present, the block vector of the current block is not added to the IBC motion information table.

Alternatively, when the IBC motion information candidate identical to the block vector of the current block is present, the IBC motion information candidate identical to the block vector of the current block is removed and the block vector of the current block is added to the IBC motion information table. This causes the same effect as updating an index of the IBC motion information candidate identical to the block vector of the current block.

When the size of the current block is smaller than a threshold value, a block vector of the current block is not added to the IBC motion information table. The threshold value may refer to at least one among the width, the height, and the number of samples. For example, when the number of samples included in the current block is equal to or smaller than 16, an IBC motion information candidate derived from the current block is not added to the IBC motion information table.

Even when the intra block copy mode is applied to the current block, an embodiment related to a merge processing region can be applied. That is, when a neighboring block adjacent to the current block is included in the same merge processing region as the current block, a block vector of the neighboring block is set unavailable as an IBC merge candidate of the current block.

A size and a shape of the merge processing region for the intra block copy mode may be set the same as a size and a shape of the merge processing region for the inter prediction mode.

Alternatively, information for determining the size and/or the shape of the merge processing region for the intra block copy mode may be signaled through a bitstream. For example, information indicating a difference between the size of the merge processing region for the inter prediction mode and the size of the merge processing region for the intra block copy mode may be signaled through a bitstream.

When the current block is included in the merge processing region, encoding/decoding of all blocks included in the merge processing region is completed.

Even when encoding/decoding of the blocks included in the merge processing region is completed, block vectors of the encoded/decoded blocks are not added to the IBC motion information table.

Alternatively, the IBC motion information table may be updated using only a block at a predefined position in the merge processing region. The examples of the predefined position may include at least one of the following in the merge processing region: a block positioned on the top left, a block positioned on the top right, a block positioned on the bottom left, a block positioned on the bottom right, a block positioned in the center, a block adjacent to the right boundary, and a block adjacent to the bottom boundary.

Information indicating whether the IBC motion information table is used under the intra block copy mode may be signaled through a bitstream. For example, a flag, isUsedHIbcCandList, may be signaled through a bitstream. The flag, isUsedHIbcCandList, having a value of 0 indicates that the IBC motion information table is unavailable and the flag, isUsedHIbcCandList, having a value of 1 indicates that the IBC motion information table is available.

When the IBC motion information table is unavailable, even though the number of IBC merge candidates included in the IBC merge candidate list is smaller than the threshold value, an IBC motion information candidate is not added to the IBC merge candidate list.

Alternatively, whether to use the IBC motion information table may be determined on the basis of whether the current block is included in the merge processing region, the position of the current block in a picture or a slice, or a partition type of the current block.

The IBC motion information table may be initialized on a per-preset unit. The preset unit may be a coding tree unit, multiple coding tree units, a tile, or a slice. For example, the IBC motion information table may be initialized every N coding tree unit(s) or one coding tree unit row. Herein, N may be a natural number including 1.

Initializing the IBC motion information table every coding tree unit row may mean that the IBC motion information table is initialized each time encoding/decoding of a coding tree unit adjacent to a left boundary of a picture starts.

When the IBC motion information table is empty or when the IBC motion information table is initialized, an initial IBC motion information candidate is added to the IBC motion information table. The initial IBC motion information candidate may have a block vector predefined in the encoder and the decoder.

Alternatively, the initial IBC motion information candidate may be derived from a block encoded/decoded using the intra block copy mode in a coding tree unit adjacent to the current coding tree unit. For example, the initial IBC motion information candidate may be derived from a block included in a coding tree unit adjacent to the left or the top of the current coding tree unit.

It is also possible that after setting a block vector of an IBC merge candidate as a base block vector, an offset is added or subtracted from the base block vector so that a block vector of the current block may be derived. For example, a block vector of the IBC merge candidate specified by index information, IBC_merge_idx, is set as a base block vector, and then an offset vector is added or subtracted from the base block vector so that a block vector of the current block is derived.

Information indicating whether to modify the block vector derived from the IBC merge candidate, by using an offset vector may be signaled through a bitstream. For example, a flag, IBC_merge_offset_vector_flag, indicating whether the offset vector is used may be signaled through a bitstream. When the flag, IBC_merge_offset_vector_flag, has a value of 1, the offset vector is added or subtracted from the block vector derived from the IBC merge candidate so that a block vector of the current block is derived. When the flag, IBC_merge_offset_vector_flag, has a value of 0, the block vector derived from the IBC merge candidate is set as a block vector of the current block.

Alternatively, whether the offset vector is used may be determined on the basis of the size, the shape, or block vector precision of the current block.

Maximum numbers of IBC merge candidates that the IBC merge candidate list is able to include may be determined differently depending on whether the offset vector is used. For example, when it is determined that the offset vector is not used, the maximum number of IBC merge candidates that the IBC merge candidate list is able to include is set to M. Conversely, when it is determined that the offset vector is used, the maximum number of IBC merge candidates that the IBC merge candidate list is able to include is set to N. Herein, N may be a natural number smaller than M.

For example, when it is determined that the offset vector is used, only an IBC merge candidate(s) of which an index is equal to or smaller than a threshold value among the merge candidates included in the IBC merge candidate list is set available. Specifically, among the merge candidates included in the IBC merge candidate list, only IBC merge candidate 0 and IBC merge candidate 1 of which indexes are smaller than 1 may be set available. When a plurality of IBC merge candidates are included in the IBC merge candidate list, index information (e.g., IBC_merge_idx) for specifying an IBC merge candidate set as a base block vector is signaled.

Alternatively, when it is determined that the offset vector is used, a block vector of an available neighboring block that is found first among the neighboring blocks adjacent to the current block is set as a base block vector.

When it is determined that the offset vector is used, information for determining a base block vector and information for determining an offset vector are signaled through a bitstream. For example, index information, IBC_merge_idx, for specifying an IBC merge candidate that is used as a base block vector among IBC merge candidates included in the IBC merge candidate list may be signaled through a bitstream. When the IBC merge candidate list includes only one IBC merge candidate, signaling of the index information is omitted.

Information for determining the offset vector may include information for determining the size of the offset vector and information for determining the direction of the offset vector. The information indicating the size of the offset vector may be index information indicating any one of vector size candidates. As an example, index information, distance_idx, indicating any one of vector size candidates may be signaled through a bitstream. Table 3 shows binarization of index information, distance_idx, and a value of a variable, DistFromMergeMV, for determining the size of the offset vector according to distance_idx.

TABLE 3

| distance_idx [x] [y] | binarization | DistFromMergeMV [x0] [y0] |
| --- | --- | --- |
| 0 | 0 | 4 |
| 1 | 10 | 8 |
| 2 | 110 | 16 |
| 3 | 1110 | 32 |
| 4 | 11110 | 64 |
| 5 | 111110 | 128 |
| 6 | 1111110 | 256 |
| 7 | 1111111 | 512 |

The size of the offset vector may be derived by dividing the variable, DistFromMergeMV, by a preset value. Equation 2 shows an example of determining the size of the offset vector.

$$abs(offsetMV)=DistFromMergeMV<<2 \qquad [\text{Equation 2}]$$

According to Equation 2, a value obtained by dividing a variable, DistFromMegeMV, by 4 or a value obtained by bit shifting a variable, DistFromMergeMV, to the left by 2 may be set as the size of the offset vector.

A larger number of vector size candidates or a smaller number of vector size candidates than those in the example shown in Table 3 may be used, or a range of motion vector offset size candidates may be set different from the example shown in Table 3.

For example, numbers or ranges of offset size candidates may be set differently depending on the resolution of the current picture. When the resolution of the current picture has a value equal to or greater than a predefined value, the size of the offset vector is derived using Table 3. Conversely, when the resolution of the current picture has a value smaller than the predefined value, the size of the horizontal direction component or the vertical direction component of the offset vector is set so as not to be greater than a 2-sample distance. Table 4 shows binarization of index information distance_idx, and a value of a variable DistFromMergeMV for determining the size of the offset vector according to distance_idx when the resolution of the current picture has a value smaller than a predefined value.

TABLE 4

| distance_idx [x] [y] | binarization | DistFromMergeMV [x0] [y0] |
|---|---|---|
| 0 | 0 | 4 |
| 1 | 10 | 8 |
| 2 | 110 | 16 |
| 3 | 1110 | 32 |
| 4 | 11110 | 64 |
| 5 | 11111 | 128 |

Alternatively, on the basis of block vector precision, ranges of motion vector offset size candidates may be set different. As an example, when the block vector precision for the current block is a fractional pel, values of variables DistFromMergeMV corresponding to values of index information distance_idx are set to 1, 2, 4, 8, 16, or etc. Herein, the fractional pel may include at least one among a $\frac{1}{16}$ pel, an octo-pel, a quarter-pel, and a half-pel. However, when the block vector precision for the current block is an integer pel, values of variables DistFromMergeMV corresponding to values of index information distance_idx are set to 4, 8, 16, 32, 64, or etc. That is, depending on the block vector precision for the current block, tables that are referred to so as to determine a variable DistFromMergeMV may be set different.

For example, when the block vector precision of the current block or of the merge candidate is a quarter-pel, a variable, DistFromMergeMV, indicated by distance_idx is derived using Table 3. However, when the block vector precision of the current block or of the merge candidate is an integer pel, a value that is N times (for example, four times) a value of a variable, DistFromMergeMV, indicated by distance_idx in Table 3 is derived as a value of a variable, DistFromMergeMV.

The information indicating the direction of the offset vector may be index information indicating any one of vector direction candidates. As an example, index information, direction_idx, indicating any one of vector direction candidates may be signaled through a bitstream. Table 5 shows binarization of index information, direction_idx, and a direction of an offset vector according to direction_idx.

TABLE 5

| direction_idx[x] [y] | binarization | sign [x] [y] [0] | sign [x] [y] [1] |
|---|---|---|---|
| 0 | 00 | +1 | 0 |
| 1 | 01 | −1 | 0 |
| 2 | 10 | 0 | +1 |

TABLE 5-continued

| direction_idx[x] [y] | binarization | sign [x] [y] [0] | sign [x] [y] [1] |
|---|---|---|---|
| 3 | 11 | 0 | −1 |

In Table 5, the expression sign[0] denotes a horizontal direction and the expression sign[1] denotes a vertical direction. The expression +1 denotes that a value of an x-component or a y-component of an offset vector is + (positive). The expression −1 denotes that a value of an x-component or a y-component of an offset vector is − (negative). Equation 3 shows an example of determining an offset vector on the basis of the size and the direction of the offset vector.

$$offsetMV[0]=abs(offsetMV)*sign[0]$$

$$offsetMV[1]=abs(offsetMV)*sign[1] \quad \text{[Equation 3]}$$

In Equation 3, the expression offsetMV[0] denotes a vertical direction component of an offset vector and the expression offsetMV[1] denotes a horizontal direction component of an offset vector.

FIG. 32 is a view showing an offset vector according to a value of distance_idx indicating a size of an offset vector and to a value of direction_idx indicating a direction of an offset vector.

As in the example shown in FIG. 32, the size and the direction of the offset vector may be determined depending on a value of distance_idx and a value of direction_idx. The maximum size of the offset vector may be set so as not to exceed a threshold value. Herein, the threshold value may be a value predefined in the encoder and the decoder. As an example, the threshold value may be a 32-sample distance. Alternatively, the threshold value may be determined depending on a size of an initial motion vector. As an example, a threshold value for a horizontal direction may be set on the basis of a size of a horizontal direction component of an initial motion vector, and a threshold value for a vertical direction may be set on the basis of a size of a vertical direction component of an initial motion vector.

Under the IBC motion vector prediction mode, a block vector of the current block may be derived by adding a block vector prediction value and a block vector difference value. The block vector prediction value may be derived from neighboring blocks adjacent to the current block. For example, a first block vector prediction candidate may be derived from a block positioned above the current block and a second block vector prediction candidate may be derived from a block positioned on the left of the current block.

When a plurality of block vector prediction candidates are available, information specifying at least one of the plurality of block vector prediction candidates is signaled through a bitstream. For example, a flag, IBC_mvp_flag, specifying any one two block vector prediction candidates may be signaled through a bitstream.

The block vector difference value may be determined on the basis of information signaled through a bitstream. The information may include information for determining the size of the block vector and information for determining the direction of the block vector.

A reference block may be specified by a block vector S2802, and samples in the reference block specified by the block vector may be set as prediction samples of the current block S2803.

Searching for a reference block may be performed within a predetermined region. Accordingly, the maximum value of the block vector of the current block may be determined as a difference between a boundary of the current block and a boundary of the predetermined region. For example, the maximum value of the horizontal direction block vector may be set as a difference value between the left boundary of the current block and the left boundary of the predetermined region. The maximum value of the vertical direction block vector may be set as a difference value between the top boundary of the current block and the top boundary of the predetermined region.

Under the IBC merge mode, when the maximum value of the block vector of the IBC merge candidate is greater than the maximum value of the block vector of the current block, the IBC merge candidate may be set unavailable. Alternatively, when the maximum value of the block vector of the IBC merge candidate is greater than the block vector of the current block, the block vector of the IBC merge candidate is changed to the maximum value of the block vector of the current block.

The predetermined region may include at least one among a current coding tree unit including the current block, a neighboring coding tree unit adjacent to the current coding tree unit, a current slice including the current block, and a current tile including the current block.

For example, a reference block may be searched from a current coding tree unit and a neighboring coding tree unit. That is, a block not included in a current coding tree unit or a neighboring coding tree unit may not be set as the reference block. Herein, the neighboring coding tree unit may include at least one of a left coding tree unit adjacent to the left, a top coding tree unit adjacent to the top, a top left coding tree unit adjacent to the top left corner, a top right coding tree unit adjacent to the top right corner or a bottom left coding tree unit adjacent to the bottom left corner of the current coding tree unit.

A partial region of a neighboring coding tree unit may be set as an unavailable region. A block included in the unavailable region may be set so as not to be set as a reference block of the current block. The unavailable region may be determined on the basis of the position of the current block in the current coding tree unit. Specifically, at least one among the size of the unavailable region and the number of the unavailable regions may be determined on the basis of the position of the current block.

FIG. 33 is a view showing an example of an unavailable region according to a position of a current block.

After dividing a current coding tree unit and a neighboring coding tree into a plurality of regions that are the same in size and shape, unavailable regions may be determined differently depending on the region to which the current block belongs in the current coding tree unit. In FIG. 33, it shows that each of the current coding tree unit and the neighboring coding tree unit is divided into four regions, but the coding tree units may be divided into a smaller number or a larger number of regions than shown.

A region to which the current block belongs may be determined on the basis of a position of a predetermined sample in the current block. The predetermined sample may include at least one of a top left sample, a top right sample, a bottom left sample, a bottom right sample, or a center sample.

For example, when the current block belongs to a top left region in the current coding tree unit, a top left region of the left coding tree unit is set as an unavailable region.

When the current block belongs to a top right region in the current coding tree unit, a top left region and a top right region of the left coding tree unit are set as unavailable regions.

When the current block belongs to a bottom left region in the current coding tree unit, a top left region, a top right region, and a bottom left region of the left coding tree unit are set as unavailable regions.

When the current block belongs to a bottom right region in the current coding tree unit, all regions of the left coding tree unit are set as unavailable regions.

Alternatively, after storing a block, which encoding/decoding is completed and included in the current picture, to a buffer with a predetermined size, a reference block may be searched from the buffer.

The size of the buffer may be predefined in the encoder and the decoder. For example, a 128×128 size or a 256×256 size may be defined as the size of the buffer. Alternatively, the size of the buffer may be determined depending on the size of the coding tree unit. For example, the buffer may be set in a 256*N size and N may be derived using a value obtained by dividing 128 or 64 by the size of the coding tree unit.

After encoding/decoding of the current block is completed, reconstructed samples of the current block are added to the buffer. Herein, the reconstructed sample may be a sample before or after an in-loop filter is applied.

The storage position of the current block in the buffer may be determined on the basis of the position of the current block in the current picture. For example, the x-axis storage position of the current block may be determined by the modulo operation of the x-axis position of the current block in the current picture and the width of the buffer. The y-axis storage position of the current block may be determined by the modulo operation of the y-axis position of the current block in the current picture and the height of the buffer.

When a pre-stored reconstructed sample is present at a storage position of a current reconstructed sample, the pre-stored reconstructed sample is replaced with the current reconstructed sample.

When the buffer is used, a block vector represents a difference between the storage position of the current block in the buffer and the position of the reference block in the buffer. The maximum size of the block vector may be determined on the basis of the storage position of the current block in the buffer. For example, a horizontal direction component of the block vector may be determined using the maximum value among a difference between the storage position of the current block in the buffer and the left boundary of the buffer and a difference between the storage position of the current block in the buffer and the right boundary of the buffer. A vertical direction component of the block vector may be determined using a difference between the storage position of the current block in the buffer and the top boundary of the buffer.

The IBC motion information table may be initialized on a per-preset unit. The preset unit may be a coding tree unit, plural coding tree units, a tile, or a slice. For example, the buffer may be initialized every N coding tree unit(s) or one/plural coding tree unit rows. Herein, N may be a natural number including 1.

Intra-prediction is a method for performing prediction on a current block by using a reconstructed sample that has been already encoded/decoded and which is around the current block. In this connection, a reconstructed sample before applying an in-loop filter may be used for intra-prediction of the current block.

An intra-prediction method includes intra-prediction based on a matrix and intra-prediction according to a direction with a neighboring reconstruction sample. Information indicating an intra-prediction method of a current block may be signaled in a bitstream. The information may be a 1-bit flag. Alternatively, an intra-prediction of a current block may be determined on the basis of at least one of a position of the current block, a size of the current block, a shape of the current block, or an intra-prediction method of a neighboring block. In an example, when a current block is present crossing a picture boundary, it may be set such that an intra-prediction method based on a matrix is not applied to the current block.

An intra-prediction method based on a matrix is a method of obtaining a prediction block of a current block on the basis of a matrix product of a matrix stored in the encoder and the decoder, and reconstruction samples around the current block. Information for specifying any one of a plurality of prestored matrices may be signaled in a bitstream. The decoder may determine a matrix for performing intra-prediction on a current block on the basis of the above information and a size of the current block.

General intra-prediction is a method of obtaining a prediction block of a current block on the basis of a non-directional intra-prediction mode or directional intra-prediction mode.

A residual image may be derived by subtracting a prediction image from an original image. In this connection, when the residual image is converted into a frequency domain, even though high frequency components are removed from frequency components, subjective image quality of the image does not drop significantly. Accordingly, when values of high frequency components are transformed into small values, or when values of high frequency components are set to 0, compression efficiency may be increased without causing large visual distortion. Reflecting the above feature, transform may be performed on a current block so as to decompose a residual image to two-dimensional frequency components. The transform may be performed by using transform methods such as DCT (discrete cosine transform), DST (discrete sine transform), etc.

A transform method may be determined on a basis of a block. A transform method may be determined on the basis of at least one of a prediction encoding mode for a current block, a size of the current block, or a size of the current block. In an example, when a current block is encoded through an intra-prediction mode, and a size of the current block is smaller than N×N, transform may be performed by using a transform method of DST. On the other hand, when the above condition is not satisfied, transform may be performed by using a transform method of DCT.

For a partial block of a residual image, two-dimensional image transform may not be performed. Not performing two-dimensional image transform may be referred to as transform skip. When transform skip is applied, quantization may be applied to residual values for which transform is not performed.

After performing transform on a current block by using DCT or DST, transform may be performed again on the transformed current block. In this connection, transform based on DCT or DST may be defined as first transform, and performing transform again on a block to which first transform is applied may be defined as second transform.

First transform may be performed by using any one of a plurality of transform core candidates. In an example, first transform may be performed by using any one of DCT2, DCT8, or DCT7.

Different transform cores may be used for a horizontal direction and a vertical direction. Information representing a combination of a transform core of a horizontal direction and a transform core of a vertical direction may be signaled in a bitstream.

A processing unit of first transform may differ with second transform. In an example, first transform may be performed on an 8×8 block, and second transform may be performed on a 4×4 sized sub-block within the transformed 8×8 block. In this connection, a transform coefficient for remaining regions for which second transform is not performed may be set to 0.

Alternatively, first transform may be performed on a 4×4 block, and second transform may be performed on a region having an 8×8 size including the transformed 4×4 block.

Information representing whether or not to perform second transform may be signaled in a bitstream.

Alternatively, whether to perform the second transform may be determined based on whether a horizontal directional transform core and a vertical directional transform core are identical with each other. In one example, the second transform may be performed only when the horizontal directional transform core and the vertical directional transform core are identical with each other. Alternatively, the second transform may be performed only when the horizontal directional transform core and the vertical directional transform core are different from each other.

Alternatively, the second transform may be allowed only when a predefined transform core is used for the horizontal directional transform and the vertical directional transform. In one example, when a DCT2 transform core is used for transform in the horizontal direction and transform in the vertical direction, the second transform may be allowed.

Alternatively, it may be determined whether to perform the second transform based on the number of non-zero transform coefficients of the current block. In one example, when the number of the non-zero transforms coefficient of the current block is smaller than or equal to a threshold, the prediction method may be configured not to use the second transform. When the number of the non-zero transform coefficients of the current block is greater than the threshold, the prediction method may be configured to use the second transform. As long as the current block is encoded using intra prediction, the prediction method may be configured to use the second transform.

The decoder may perform inverse-transform (second inverse-transform) to the second transform and may perform inverse-transform (first inverse-transform) to the first transform resultant from the second inverse-transform. As a result of performing the second inverse-transform and the first inverse-transform, residual signals for the current block may be obtained.

When transform and quantization are performed by the encoder, the decoder may obtain the residual block via inverse-quantization and inverse-transform. The decoder may add the prediction block and the residual block to each other to obtain the reconstructed block for the current block.

When the reconstructed block of the current block is obtained, loss of information as occurring in the process of the quantization and encoding may be reduced via the in-loop filtering. The in-loop filter may include at least one of a deblocking filter, a sample adaptive offset filter (SAO), or an adaptive loop filter (ALF).

Applying the embodiments as described about the decoding process or the encoding process to the encoding process or the decoding process respectively may be included in the scope of the present disclosure. Within the scope of the present disclosure, the embodiments in which operations occur in a predetermined order may be modified to embodiments in which the operations occur in a different order from the predetermined order.

Although the above-described embodiment is described based on a series of the operations or the flowchart, the embodiment does not limit a time-series order of the operations of the method thereto. In another example, the operations may be performed simultaneously or in a different order therefrom as necessary. Further, in the above-described embodiment, each of the components (for example, a unit, a module, etc.) constituting the block diagram may be implemented in a form of a hardware device or software. A plurality of components may be combined with each other into a single component which may be implemented using a single hardware device or software. The above-described embodiment may be implemented using program instructions that may be executed via various computer components. The instructions may be recorded in a computer-readable storage medium. The computer-readable storage medium may contain therein program instructions, data files, data structures, or the like alone or in combination with each other. Examples of the computer-readable storage media include magnetic media such as hard disks, floppy disks, and magnetic tapes, optical storage media such as CD-ROMs, DVDs, and magneto-optical media such as floptical disks, and hardware devices such as ROM, RAM, flash memory, and the like specifically configured to store therein and execute the program instructions. The hardware device may be configured to operate as one or more software modules to perform processing according to the present disclosure, and vice versa.

INDUSTRIAL AVAILABILITY

The present disclosure may be applied to an electronic device that encodes/decodes video.

What is claimed is:

1. A method of decoding a video, the method comprising:
  decoding a current block according to an intra block copy (IBC) mode, wherein decoding the current block according to the IBC mode comprises:
    constructing an IBC merge candidate list for the current block;
    selecting one of the IBC merge candidates included in the IBC merge candidate list;
    deriving a block vector of the current block based on the selected IBC merge candidate;
    obtaining a prediction sample of the current block based on the block vector; and
    determining whether to update an IBC motion information table based on the block vector of the current block, wherein when a size of the current block is smaller than a threshold size, the IBC motion information table is not updated based on the block vector of the current block,
  wherein the IBC merge candidate list includes an IBC merge candidate derived based on the IBC motion information table,
  wherein the IBC motion information table includes an IBC motion information candidate derived from a block to which an IBC mode is applied before the current block, and
  wherein a maximum number of the IBC merge candidates that the IBC merge candidate list may include is determined based on information signaled via a sequence parameter set.

2. The method of claim 1, wherein the block vector derived from the IBC merge candidate is used for a luma component of the current block, and
  wherein a block vector for a chrominance component of the current block is derived by scaling the block vector for the luma component of the current block.

3. The method of claim 2, wherein the scaling is performed based on a variable derived based on a color format between the luma component and the chrominance component.

4. The method of claim 1,
  wherein, during the construction of the IBC merge candidate list, when a number of IBC merge candidates included in the IBC merge candidate list is less than a threshold number, a first IBC information candidate included in an IBC motion information table is added to the IBC merge candidate list as a new IBC merge candidate,
  wherein the method further comprises determining whether to update the IBC motion information table based on the block vector of the current block, and
  wherein when a second IBC information candidate identical to the block vector of the current block is already included in the IBC motion information table, the second IBC information candidate is removed from the IBC motion information table and the block vector of the current block is added to the IBC motion information table with a highest index.

5. The method of claim 1, wherein when a size of the current block is greater than the threshold size, a first IBC information candidate is added to the IBC merge candidate list after adding an IBC merge candidate derived from an available a neighboring block adjacent to the current block, and
  wherein when a size of the current block is not greater than the threshold size, the first IBC information candidate is added to the IBC merge candidate list without deriving the IBC merge candidate from the neighboring block adjacent to the current block.

6. A method of encoding a video, the method comprising:
  encoding a current block according to an intra block copy (IBC) mode, wherein encoding the current block according to the IBC mode comprises:
    constructing an IBC merge candidate list for the current block;
    deriving a block vector of the current block;
    obtaining a prediction sample of the current block based on the block vector;
    encoding index information indicating one of the IBC merge candidates identical to the block vector of the current block; and
    determining whether to update an IBC motion information table based on the block vector of the current block, wherein when a size of the current block is smaller than a threshold size, the IBC motion information table is not updated based on the block vector of the current block,
  wherein the IBC merge candidate list includes an IBC merge candidate derived based on the IBC motion information table,
  wherein the IBC motion information table includes an IBC motion information candidate derived from a block to which an IBC mode is applied before the current block, and wherein a maximum number of the IBC merge candidates that the IBC merge candidate list may include is determined based on information signaled via a sequence parameter set.

7. The method of claim 6,
wherein, during the construction of the IBC merge candidate list, when a number of IBC merge candidates included in the IBC merge candidate list is less than a threshold number, a first IBC information candidate included in an IBC motion information table is added to the IBC merge candidate list as a new IBC merge candidate,
wherein the method further comprises determining whether to update the IBC motion information table based on the block vector of the current block, and
wherein when a second IBC information candidate identical to the block vector of the current block is already included in the IBC motion information table, the second IBC information candidate is removed from the IBC motion information table and the block vector of the current block is added to the IBC motion information table with a highest index.

8. The method of claim 6, wherein when a size of the current block is greater than the threshold size, a first IBC information candidate is added to the IBC merge candidate list after adding an IBC merge candidate a neighboring block adjacent to the current block and
wherein when a size of the current block is not greater than the threshold size the first IBC information candidate is added to the IBC merge candidate list without deriving the IBC merge candidate from the neighboring block adjacent to the current block.

* * * * *